United States Patent [19]
Kreitzer et al.

[11] Patent Number: 5,268,792
[45] Date of Patent: Dec. 7, 1993

[54] ZOOM LENS

[75] Inventors: Melvyn Kreitzer; Jacob Moskovich, both of Cincinnati, Ohio

[73] Assignee: Eastman Kodak Company, Rochester, N.Y.

[21] Appl. No.: 702,862

[22] Filed: May 20, 1991

[51] Int. Cl.$^5$ .................................. G02B 15/14
[52] U.S. Cl. .............................. 359/676; 359/689
[58] Field of Search ................. 359/672–677, 359/763–784, 686, 689, 656–661, 684–690, 676–690

[56] References Cited

U.S. PATENT DOCUMENTS

| | | | |
|---|---|---|---|
| 4,198,128 | 4/1980 | Ogino | 359/681 |
| 4,571,031 | 2/1986 | Kato | 359/680 |
| 4,682,860 | 7/1987 | Tanaka et al. | 359/692 |
| 4,720,179 | 1/1988 | Ito | 359/692 |
| 4,757,336 | 7/1988 | Nakayama et al. | 359/689 |
| 4,787,718 | 11/1988 | Cho | 359/686 |
| 4,818,081 | 4/1989 | Ito | 359/692 |
| 4,830,476 | 5/1989 | Aoki | 359/692 |
| 4,836,660 | 6/1989 | Ito | 359/692 |
| 4,854,680 | 8/1989 | Kikuchi | 359/676 |
| 4,854,683 | 8/1989 | Ozawa | 359/689 |
| 4,889,416 | 12/1989 | Yamada | 359/691 |
| 4,936,661 | 6/1990 | Betensky et al. | 359/692 |
| 4,953,957 | 9/1990 | Kobayashi | 359/652 |
| 4,955,700 | 11/1990 | Yamaguchi | 359/689 |
| 4,993,814 | 2/1991 | Hata | 359/691 |
| 5,042,926 | 8/1991 | Kikuchi | 359/676 |
| 5,062,695 | 11/1991 | Iwasaki | 359/689 |

FOREIGN PATENT DOCUMENTS

| | | | |
|---|---|---|---|
| 284819 | 11/1989 | Japan | 359/676 |
| 150518 | 6/1991 | Japan | 359/676 |
| 260611 | 11/1991 | Japan | 359/676 |
| 93812 | 3/1992 | Japan | 359/676 |

Primary Examiner—Bruce Y. Arnold
Assistant Examiner—Thong Nguyen
Attorney, Agent, or Firm—Svetlana Z. Short

[57] ABSTRACT

This invention relates to a compact zoom lens. The zoom lens comprises of small number of elements arranged in three groups. The first group has negative refractive power, the second group has positive refractive power and the third group has negative refractive power. The air space between each of two adjacent groups is made variable to effect zooming.

43 Claims, 9 Drawing Sheets

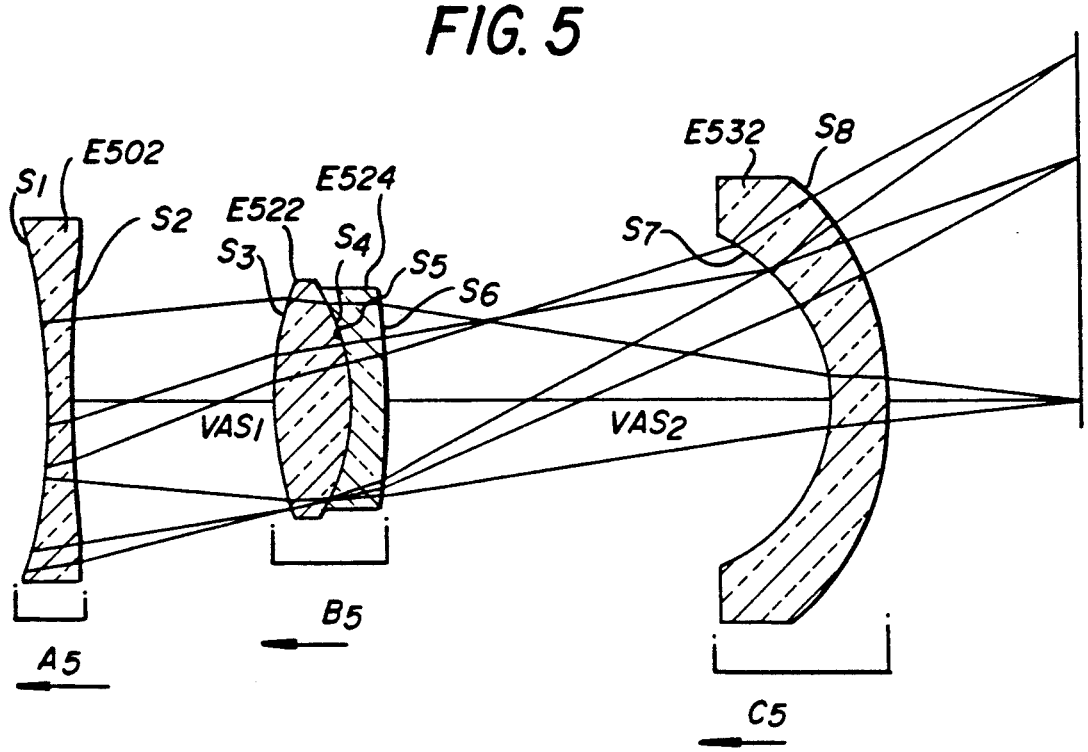
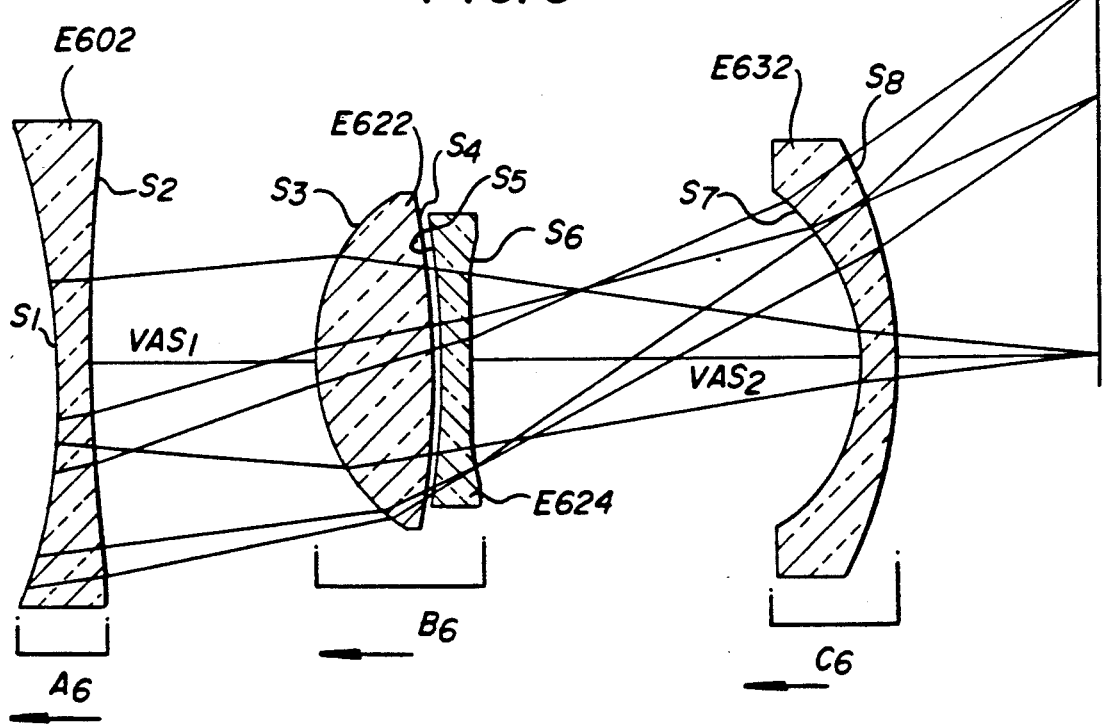

ZOOM LENS

BACKGROUND OF THE INVENTION

1. Field of the Invention

This invention relates to compact zoom lenses suitable for use in photographic devices.

2. Description Relative to the Prior Art

A number of kinds of zoom lenses are known for use in single lens reflex (SLR) cameras. Many such SLR camera lenses are so-called "short" zoom lenses that are comprised of a front negative component and a rear positive component. An example of such a zoom lens is disclosed in U.S. Pat. No. 4,198,128. Although this zoom lens itself is relatively short, it has a long back focal length. The long back focal length provides the necessary space in the SLR camera to allow for insertion of a mirror. However, the length from the first lens surface to the image forming or focal plane is relatively long. Thus, even though the lens itself may be short, a camera embodying the lens is inevitably bulky because of the long back focal length.

A non-SLR camera (sometimes called a "viewfinder" camera) does not require a long back focal length. There is thus an opportunity to provide a less bulky camera by designing a compact zoom lens with a short back focal length.

U.S. Pat. No. 4,936,661 describes a zoom lens having a short back focal length with negative, positive and negative units from front to rear. The negative unit closest to the image provides the majority of the change in focal length. In the less complex examples the front negative and positive units do not move relative to each other. In these examples the chromatic aberration could not be sufficiently corrected to get both a high aperture and a broad zoom range.

A zoom lens system disclosed in Japanese Kokai (unexamined Publication) No. 56-128,911, includes a first positive lens group and a second negative lens group which move relatively to vary the distance therebetween and to vary the focal length of the system for zooming. This zoom lens system, while being sufficiently short in overall length when adjusted for wide-angle photography, is limited to a zooming ratio of approximately 1.5, which is less than that usually available for an SLR camera.

Another zoom lens, disclosed in U.S. Pat. No. 4,787,718, comprises a first negative lens group, a second and a third positive lens group, and a rear negative lens group. It has a zooming ratio of about $2\times$ and a sufficiently shortened overall length. This lens system has four moving groups, and although the distance between the first and third lens group is maintained during zooming, the two positive groups move at different speeds, and the relative distance between them changes. This zoom lens system has eight glass elements.

A zoom lens disclosed in U.S. Pat. No. 4,830,476 comprises two moving lens groups—a front positive lens group and a rear negative lens group. This zoom lens is relatively compact and has a zooming ratio of about $2\times$. Both the front group and the rear group have one positive and one negative lens element. Although this zoom lens has only four lens elements, in order to correct aberrations sufficiently, all five embodiments use at least three, and sometimes four, gradient index elements.

A zoom lens disclosed in U.S. Pat. No. 4,818,081 uses a configuration similar to the one disclosed in '476. As in '476, the front lens group of the lens system disclosed in U.S. Pat. No. '081 contains negative and positive subgroups which stay together during zooming. In addition, as in the zoom lens disclosed by '476, the rear zooming lens unit contains a positive, as well as a negative lens. This lens has a zooming range of 1.5 to $1.6\times$ which is less than generally desirable for an SLR camera.

SUMMARY OF THE INVENTION

An object of the present invention is to provide a compact zoom lens particularly suited for use in a non-SLR camera in which a zoom lens with relatively few optical elements is color corrected for the range of interest. Another object of the present invention is to produce a zoom lens with low manufacturing cost According to the present invention, one or all of the above objects are accomplished by a zoom lens comprising three optical units movable for zooming and, having, from front to rear, negative, positive and negative powers, respectively. The change of magnification effected during zooming by the negative third optical unit is at least equal to, and preferably greater than, that of the positive optical unit. The power of the third optical unit ($K_3$) is approximately equal to the power of the system at the short focal length zoom position $$.7 < \frac{K_3}{K_w} < 1.3$$

This is because the third group is used mainly for correction of Petzval curvature and does not need to contribute power in the short focal length position, since $K_w \approx K_1 + K_2$, where $K_w$ is the power of a zoom lens in a wide angle (or a short focal length) position and $K_i$ is the power of the $i^{th}$ optical unit power.

According to another aspect of the invention, the ratio of powers of the first to third optical units $K_1/K_3$ is always larger than 0.6, preferably larger than 1.

According to a further preferred embodiment, the first negative optical unit has a front negative lens element. This ratio guarantees weaker power of the first group relative to the third group so that an extra element will not be needed for color correction. Because extra elements are not needed the resulting design is compact as well as inexpensive to make. In addition, weaker elements generally have larger tolerances and thus manufacturing is easier. As a consequence, the third optical unit can be of relatively simple construction because the effective aperture at the wide angle position can be small as a result of its close proximity to the image plane.

For many compact cameras, it is also desirable that the manufacturing cost be low. Thus according to a preferred embodiment of the invention, the zoom lens has few lens elements and uses plastic optical materials. In fact, according to a preferred embodiment, it has been found that a well corrected zoom lens can be designed with as few as three lens elements if such a three optical unit construction is employed in which a relatively strong first negative optical unit is followed by a positive second optical unit and a third negative optical unit. If the powers and optical materials are chosen correctly, chromatic aberrations can be corrected, even though the individual units are not color corrected.

It is an advantage of a preferred embodiment of the invention that the lens system can be color corrected without correcting each unit separately. However, this is a valuable feature when considering the limited available choice of optical plastic materials. For further aberration correction, for example, in designing extensions of zoom range, it is desirable to partially correct the color of the positive optical unit, for example by forming the positive unit of two or more elements.

BRIEF DESCRIPTION OF THE DRAWINGS

An embodiment of the present invention will now be described, by way of example, with reference to the accompanying drawings, in which:

FIG. 5 shows the outline of a zoom lens corresponding to a fifth illustrative embodiment of the present invention; and FIG. 6 shows the outline of a zoom lens corresponding to a sixth illustrative embodiment of the present invention;

DETAILED DESCRIPTION OF THE PREFERRED EMBODIMENT

The lens systems in accordance with the present invention, in the form of an easily manufacturable compact zoom lens, comprise, from front-to-rear, a first, negative optical unit A axially movable for compensation, a second, positive optical unit B, axially movable for change in magnification, a third, negative optical unit C, axially movable for change in magnification, and in one of the illustrative embodiments, a fourth, fixed optical unit D. Focus control is achieved by moving either the optical unit A, or optical unit B, or both, as exemplified by the various embodiments. Color correction is achieved by distribution of negative power between the first and third optical units (A and C). The variable airspaces are denoted by letters $VAS_i$, where subscript i is an integer from 1 to 4 and denotes the numerical order of the airspaces. For example, there is a variable airspace $VAS_1$ between the negative optical unit A and the positive optical unit, B, as well as another variable airspace $VAS_2$ between the positive optical unit B and the negative optical unit C to effect zooming between wide angle mode and telephoto mode of operation. In all of the embodiments the zooming spaces have been desensitized to aberration determination with zoom motion. The invention comprises several distinct species that will be described below in greater detail.

All linear dimensions in this Specification are millimeters unless specified otherwise.

Figure 1:
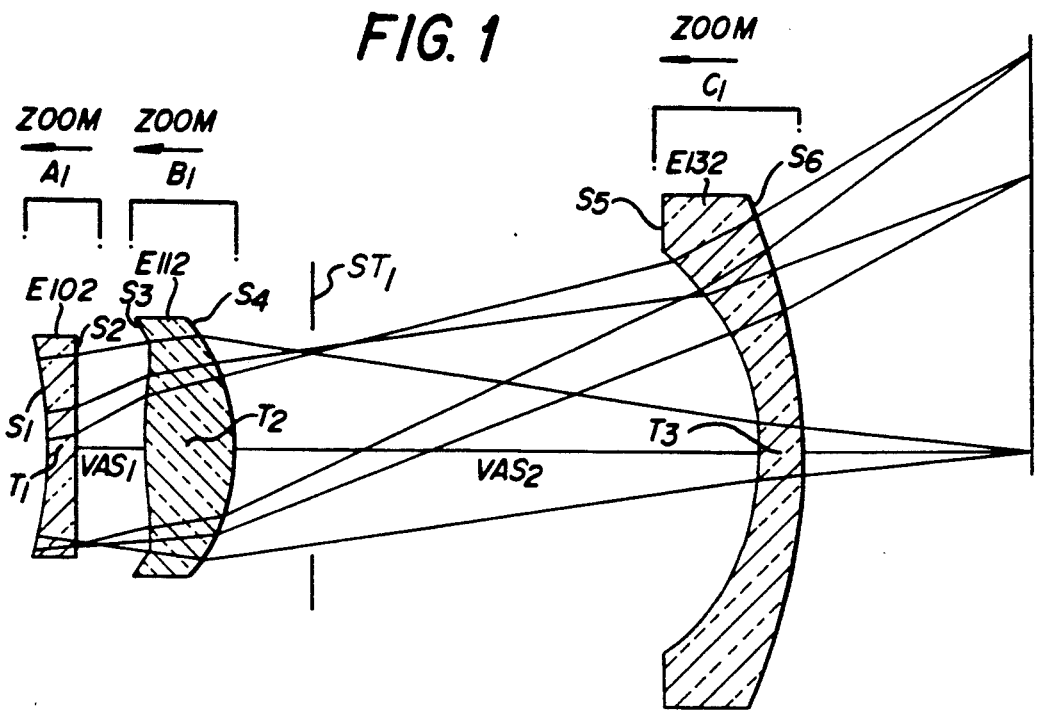
FIG. 1 shows the outline of a zoom lens corresponding to a first illustrative embodiment of the present invention.

The first zoom lens embodiment corresponding to the first species of the present invention is given a reference numeral 1 and is illustrated in FIG. 1. It comprises three optical units. This embodiment is illustrative of the species in which each of the optical units has only one lens element.

An important characteristic of this species is that while each optical unit has only one lens element, and while each of the optical units is not individually color corrected, the overall optical zoom lens system is color corrected.

The lens system includes a first, negative optical unit $A_1$, a second, positive optical unit $B_1$ and a third, negative optical unit $C_1$. As the focal length of the lens increases, all optical units move away from the film plane at different speeds. While the movements of the second and third optical units contribute to the change in magnification, the movement of the third optical unit $C_1$ is primarily responsible for that change. The aperture stop $ST_1$ position is fixed with respect to the second optical unit $B_1$, and is located between the second optical unit $B_1$ and the third optical unit $C_1$. The lens system is so structured that the effective focal length of the overall lens system is varied by changing, relative to each other, distance $VAS_1$ between the first and the second optical units $A_1$ and $B_1$, distance $VAS_2$ forming a part of the space between the second and the third optical units $B_1$ and $C_1$.

Each of the lens elements is plastic. Thus, aspheric surfaces can be manufactured relatively inexpensively Therefore, there is at least one aspheric surface per lens element.

The aspheric equation describing these surfaces is:

$$X = \frac{CY^2}{1 + \sqrt{1 - (K+1)C^2 Y^2}} + ADY^4 + AEY^6 + AFY^8 +$$

-continued $$AGY^{10} + AHY^{12} + AIY^{14}$$

where
- X: is the distance along the optical axis
- Y: is the height from an optical axis
- C: is the vertex radius of curvature of a curved surface
- K: is the Conic coefficient and
- AD through AI: are aspheric coefficients of 4th, 6th, 8th, 10th, 12th and 14th order The value of the terms AD, AE, AF, AG, AH, AI and K for the various surfaces are given in table 1b.

The first, front optical unit $A_1$ is in a form of a negative biconcave lens component. This lens component is a single lens element E102 having front and rear surfaces $S_1$ and $S_2$ and thickness $T_1$. Both the front surface $S_1$ and the rear surface $S_2$ are aspheric. The values of the radii of surfaces $S_1$ and $S_2$ and the value $T_1$, as well as the radii of the curvature and thicknesses of the rest of the elements are given in Table 1A. The values of aspheric coefficients are given in Table 1B.

A second optical unit $B_1$ is spaced from the first optical unit $A_1$, by a variable airspace $VAS_1$. The second optical unit $B_1$ has positive refractive power and is in a form of a single positive lens component. This lens component is a biconvex lens element E112 having front and rear surfaces $S_3$ and $S_4$ and thickness $T_2$. The front surface $S_3$ and the rear surface $S_4$ of the lens element E112 are also aspherical surfaces.

The third optical unit $C_1$ is spaced from the second optical unit $B_1$ by a variable airspace $VAS_2$. The third optical unit $C_1$ is negative and therefore consists of a negative lens component. This lens component is a single negative meniscus lens element E132 having a front and a rear radii $S_5$ and $S_6$ and a thickness $T_3$. The rear surface $S_6$ is aspherical.

This first embodiment varies from a focal length of 38.024 mm. and f/4.6 to a focal length of 65.208 mm and f/7.3. The ratio of powers of the first to the third optical unit is=1.6. The ratio of long focal length to the short focal length is 1.7. Table 1 gives various parameters of the lens illustrarted in FIG. 1A, including the radii of the surfaces $S_1$ to $S_6$ of the elements E102 to, E112 and E132. Table 1B gives values of the aspheric coefficients for surfaces $S_1$, $S_2$, $S_3$, $S_4$ and $S_6$. Table 1-C gives further parameters for the lens illustrated in FIG. 1.

TABLE 1-A

| SURFACE | VERTEX RADIUS | THICKNESS | GLASS | CLEAR APERTURE |
|---|---|---|---|---|
| S1 | −15.32 | 1.300 | KPOLYSTY | 9.8 |
| S2 | 717.58 | VAS$_1$ | | 9.7 |
| S3 | 20.98 | 4.229 | ACRYLIC | 10.3 |
| S4 | −12.44 | 3.145 | | 11.1 |
| | ∞ | 2.614 | | 9.7 |
| | ∞ | VAS$_2$ | | 10.0 |
| S5 | −11.92 | 1.900 | KPUV | 18.1 |
| S6 | −28.44 | VAS$_3$ | | 22.2 |
| | ∞ | 11.017 | | 31.3 |

TABLE 1-B

POLYNOMIAL ASPHERS
(COEFFICIENTS OF THE EVEN POWERED TERMS)

| SURFACE | AD (4TH) | AE (6TH) | AF (8TH) |
|---|---|---|---|
| S1 | 4.897E-06 | 1.314E-08 | 2.788E-08 |
| S2 | −9.649E-05 | −8.153E-08 | 9.231E-08 |
| S3 | −3.517E-04 | −2.120E-06 | −2.737E-07 |
| S4 | −1.248E-04 | −2.725E-06 | −1.316E-07 |

TABLE 1-B-continued

POLYNOMIAL ASPHERS
(COEFFICIENTS OF THE EVEN POWERED TERMS)

| | | | |
|---|---|---|---|
| S6 | 1.448E-05 | −2.657E-08 | 5.805E-12 |

| SURFACE | AG (10th) | AH (12TH) | AI (14TH) |
|---|---|---|---|
| S1 | −1.214E-10 | −2.570E-11 | 4.017E-13 |
| S2 | −2.214E-09 | −6.570E-11 | 2.049E-12 |
| S3 | 5.549E-10 | 2.859E-10 | −1.156E-11 |
| S4 | 1.831E-10 | 5.158E-11 | −2.092E-12 |
| S6 | 6.227E-14 | −1.120E-14 | 6.029E-17 |

TABLE 1-C

| | ZOOM SPACING DATA | | | | |
|---|---|---|---|---|---|
| POSITION | VAS$_1$ | VAS$_1$ | VAS$_2$ | EFL | F/# |
| 1 | 3.164 | 19.699 | −.019 | 38.02 | 4.6 |
| 2 | 2.338 | 15.034 | 12.062 | 50.01 | 5.8 |
| 3 | 1.597 | 11.612 | 28.960 | 65.21 | 7.3 |

Figure 2:
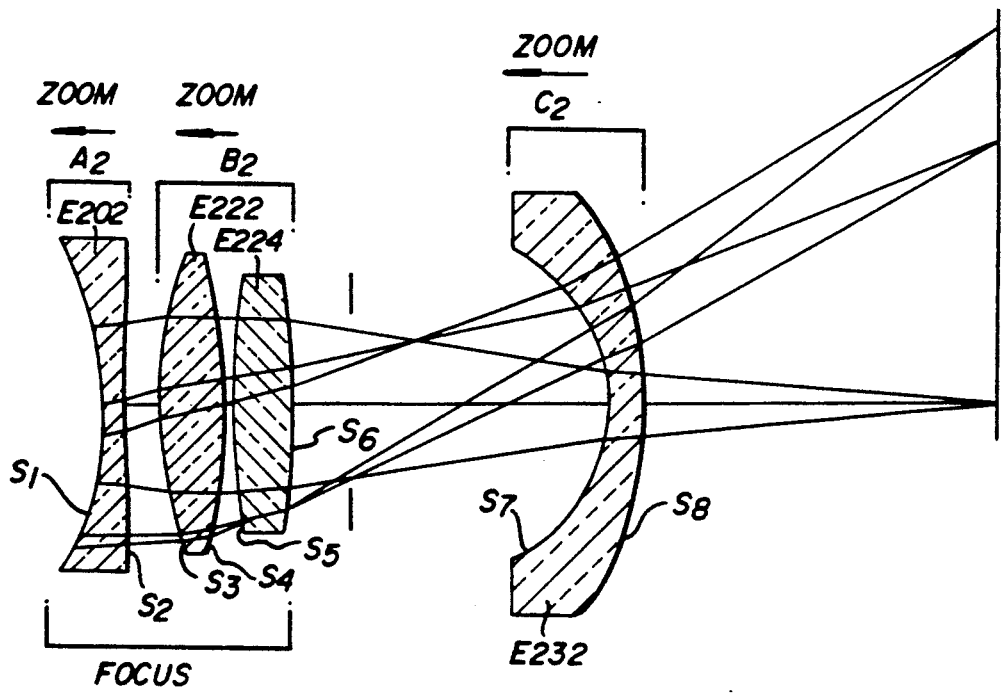
FIG. 2 shows the outline of a zoom lens corresponding to a second illustrative embodiment of the present invention.

FIG. 2 illustrates a second embodiment of the present invention and corresponds to the second species of the invention.

This second embodiment is generally similar to the first embodiment described above and illustrated in FIG. 1. In FIG. 2, the three optical units and the variable airspaces are given the same reference letters, but with a subscript "2" added. However, because the shape of lens elements and the number of elements differ from one embodiment to another, and from one species to another, distinct reference numerals are used for each lens element in each of the embodiments. Table 2A gives values for the various lens system parameters including radii of curvature, thickness elements and distances therebetween. This second illustrative embodiment includes four lens elements E202, E222, E224 and E232 arranged in three units $A_2$, $B_2$ and $C_2$. The aperture stop is located between the second optical unit $B_2$ and the third optical unit $C_2$. All three optical units move for zooming. Optical units $A_2$ and $B_2$ move for focusing. Thus, there are variable airspaces $VAS_1$ and $VAS_2$ between the first and second optical units $A_2$ and $B_2$ and the second and the third optical units $B_2$ and $C_2$, respectively. All of the elements are made of plastic. There is one aspheric surface per element. The values for aspheric coefficients are given in Table 2b.

As in the case of the first embodiment, in this second embodiment the front optical unit $A_2$ has a single negative lens element E202, and the third optical unit $C_2$ consists of a single negative biconcave lens element E232. However, the construction of the second optical unit $B_2$ of the second embodiment is different from the construction of the optical unit $B_1$ in the first embodiment. Optical unit $B_2$ is still not color corrected by itself, but it consists of two positive lens components, i.e., a biconvex lens element E222 and a biconvex lens element E224, rather than a single lens component. Splitting the optical power of the second optical unit among two or more positive components provides more aberration control and results in a better performance and a somewhat extended focal length. The quality of this lens is similar to those used in conventional 35 mm SLR cameras.

Table 2-C gives further parameters for the lens system illustrated in FIG. 2.

The ratio of the extreme focal length of the second embodiment is 68.8 mm:38.8 mm which qualifies the magnification range as 2:1.

TABLE 2-A

| SURFACE | RADIUS | THICKNESS | GLASS | CLEAR APERTURE |
|---|---|---|---|---|
| S1 | −18.804 | 1.300 | KPOLYSTY | 17.9 |
| S2 | 117.174 | VAS$_1$ |  | 17.5 |
| S3 | 16.353 | 3.900 | ACRYLIC | 16.1 |
| S4 | −34.328 | .570 |  | 15.6 |
| S5 | 44.251 | 3.400 | ACRYLIC | 13.7 |
| S6 | −55.618 | VAS$_2$ |  | 11.9 |
|  | ∞ | 14.840 |  | 7.7 |
| S7 | −9.801 | 1.930 | ACRYLIC | 16.7 |
| S8 | −24.687 | 11.097 |  | 22.0 |

TABLE 2-B

POLYNOMIAL ASPHERS
(COEFFICIENTS OF THE EVEN POWERED TERMS)

| SURFACE | AD (4TH) | AE (6TH) | AF (8TH) |
|---|---|---|---|
| S2 | −3.745E-05 | −2.177E-07 | 2.162E-09 |
| S3 | −8.042E-05 | −3.442E-07 | −3.732E-10 |
| S6 | 2.698E-05 | −8.546E-07 | 1.232E-08 |
| S8 | −1.592E-05 | 5.291E-07 | −8.063E-09 |

| SURFACE | AG (10TH) | AH (12TH) | AI (14TH) |
|---|---|---|---|
| S2 | −4.515E-12 | −1.463E-13 | 3.018E-16 |
| S3 | 1.163E-11 | 3.655E-13 | −6.877E-15 |
| S6 | 5.410E-12 | −5.623E-12 | 6.274E-14 |
| 8S | 9.649E-12 | 5.651E-13 | −3.282E-15 |

TABLE 2-C

ZOOM SPACING DATA

| POSITION | VAS$_1$ | VAS$_2$ | BFL | EFL | F/# |
|---|---|---|---|---|---|
| 1 | 2.882 | 13.935 | 11.0983 | 38.80 | 4.4 |
| 2 | 1.709 | 11.205 | 20.4615 | 50.08 | 5.6 |
| 3 | .400 | 8.840 | 34.897 | 68.58 | 7.2 |

Tables 3A through 3C provide an additional example of the second species, and a third illustrative embodiment of the present invention.

Figure 3:
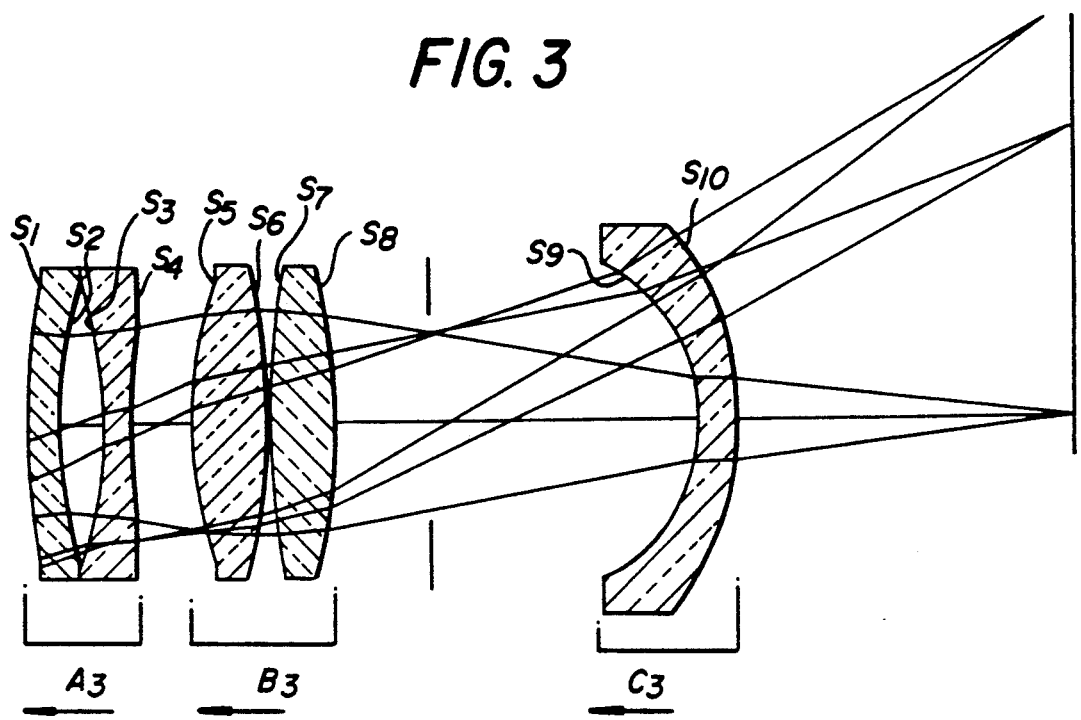
FIG. 3 shows the outline of a zoom lens corresponding to a third illustrative embodiment of the present invention.

The third illustrative embodiment, shown in FIG. 3, is very similar to the second illustrative embodiment illustrated in FIG. 2. The main difference between the second and the third illustrative embodiments is that the first movable front unit comprises two negative lens components, instead of a single negative lens component. The first lens component is a meniscus lens element oriented with its concave surface towards the second component. The second component is nominally biconcave, meaning that its vertex radii of curvature define a biconcave lens component. The third illustrative embodiment is a very compact 3× zoom lens with a minimum BFL at wide angle position of 17.3. As the focal length of the lens increases, all optical units move away from a film plane at different rates. The aperture stop moves with a second moving optical unit and maintains constant size throughout the zoom range. Because a first negative unit 301 of this embodiment consists of two negative lens elements a 3× magnification change or zoom range was achieved. However, at 3× it was difficult to correct for axial color at a wide angle position with only five elements, thus this design should be used with either a very narrow spectral band, or monochromatically. It is possible that a modified form of this five element design will work better for a zoom range shorter than 38-90.

TABLE 3-A

| SURFACE | RADIUS | THICKNESS | OPTICAL MATERIAL | CLEAR APERTURE |
|---|---|---|---|---|
| S1 | 43.603 | 1.500 | KPOLYSTY | 14.4 |
| S2 | 25.305 | 2.408 |  | 13.8 |
| S3 | −21.027 | 1.300 | KPUV | 13.8 |
| S4 | 37.822 | VAS$_1$ |  | 14.3 |
| S5 | 14.122 | 3.900 | KACRYLIC | 14.4 |
| S6 | −34.544 | .149 |  | 14.5 |
| S7 | 38.447 | 3.400 | KACRYLIC | 14.3 |
| S8 | −44.390 | 4.505 |  | 13.9 |
|  | ∞ | VAS$_2$ |  | 10.4 |
| S9 | −8.580 | 1.930 | KACRYLIC | 14.6 |
| S10 | −14.985 | 63.225 |  | 18.3 |

TABLE 3-B

POLYNOMIAL ASPHERS
(COEFFICIENTS OF THE EVEN POWERED TERMS)

| SURFACE | AD (4TH) | AE (6TH) | AF (8TH) |
|---|---|---|---|
| S1 | −1.877E-05 | −1.303E-07 | −7.509E-10 |
| S4 | −1.066E-04 | −4.836E-07 | 2.081E-09 |
| S5 | −1.790E-04 | −7.582E-07 | −4.329E-09 |
| S8 | −2.344E-05 | −1.263E-06 | 6.102E-09 |
| S10 | 3.162E-07 | 3.960E-07 | −9.166E-09 |

| SURFACE | AG (10TH) | AH (12TH) | AI (14TH) |
|---|---|---|---|
| S1 | −2.246E-12 | −7.946E-14 | −5.693E-15 |
| S4 | −6.140E-11 | −1.798E-12 | −2.293E-14 |
| S5 | −2.996E-11 | −8.389E-13 | −5.785E-14 |
| S8 | −3.576E-11 | −6.482E-12 | 8.306E-14 |
| S10 | 4.786E-11 | 7.227E.13 | −7.425E-15 |

TABLE 3-C

ZOOM SPACING DATA

| POSITION | VAS$_1$ | VAS$_2$ |
|---|---|---|
| 1 | 3.056 | 14.288 |
| 2* | .999 | 9.179 |
| 3 | .400 | 7.931 |

Figure 4:
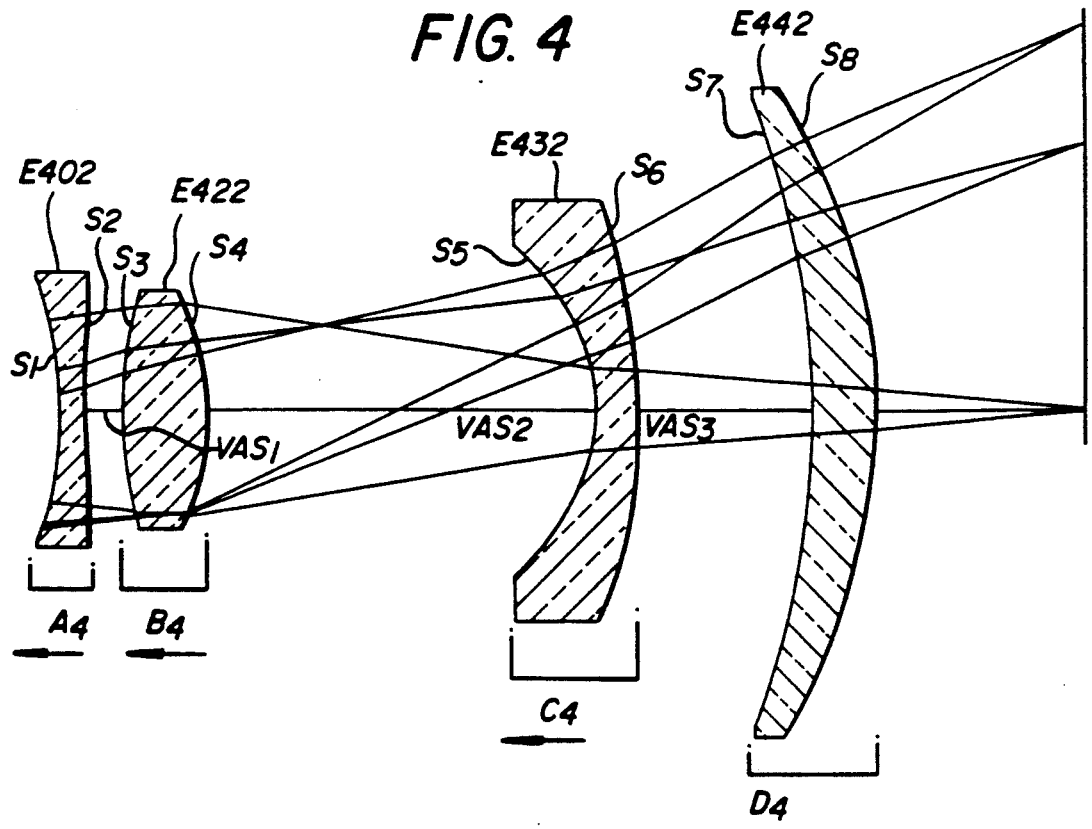
FIG. 4 shows the outline of a zoom lens corresponding to a fourth illustrative embodiment of the present invention.

FIG. 4 illustrates a fourth illustrative embodiment and corresponds to the third species of the invention. In FIG. 4, the three moving optical units are given the same reference letters as their counterparts in the first embodiment described above and illustrated in FIG. 1, but with the subscript "4" added.

In this fourth embodiment, the first movable front optical unit A$_4$ includes a single negative lens component consisting of a single biconcave lens element E402, a movable optical unit B$_4$ includes a single positive lens component consisting of a biconvex lens element E422, and a third movable optical unit C$_4$ includes a negative lens component consisting of a meniscus lens element E432. The lens elements of the first three optical units are made of plastic and have at least one aspheric surface per each of the elements. In addition, there is a fourth, fixed positive optical unit D$_4$ located to the rear of the third optical unit C$_4$. The fourth, fixed optical unit D$_4$ consists of a single positive meniscus glass lens element E442. This fourth optical unit D$_4$ helps with aberration corrections, and it also helps to flatten the field. Table 4A gives values for various parameters of the lens illustrated in FIG. 4, including the radii of the elements and their thicknesses. Table 4B gives values for the aspheric coefficients describing the aspheric surfaces of the plastic lens elements.

TABLE 4-A

| SURFACE | RADIUS | THICK-NESS | GLASS | CLEAR APERTURE |
|---|---|---|---|---|
| S1 | −18.263 | 1.800 | KPOLYSTY | 12.4 |
| S2 | 85.945 | VAS$_1$ | | 11.8 |
| S3 | 14.408 | 4.100 | ACRYLIC | 10.6 |
| S4 | −15.033 | 5.557 | | 10.8 |
| | ∞ | 2.614 | | 8.6 |
| | ∞ | VAS$_2$ | | 9.5 |
| S5 | −9.976 | 1.900 | KPUV | 15.4 |
| S6 | −27.393 | VAS$_3$ | | 19.7 |
| S7 | −42.700 | 3.000 | F5 | 28.8 |
| S8 | −80.643 | 10.880 | | 30.0 |

TABLE 4-B

POLYNOMIAL ASPHERS
(COEFFICIENTS OF THE EVEN POWERED TERMS)

| SURFACE | AD (4TH) | AE (6TH) | AF (8TH) |
|---|---|---|---|
| S2 | −6.841E-05 | 1.856E-06 | −4.992E-08 |
| S3 | −1.888E-04 | −1.638E-07 | −1.152E-07 |
| S4 | −3.319E-05 | −1.008E-06 | −1.047E-07 |
| S6 | 1.880E-05 | −1.166E-07 | 2.649E-09 |

| SURFACE | AG (10TH) | AH (12TH) | AF (14TH) |
|---|---|---|---|
| S2 | −1.929E-10 | 4.135E-11 | −6.148E-13 |
| S3 | −1.416E-09 | 1.221E-10 | −3.332E-12 |
| S4 | −5.438E-11 | 4.885E-11 | −1.466E-12 |
| S6 | −4.993E-11 | 3.791E-13 | −1.053E-15 |

TABLE 4-C

ZOOM SPACING DATA

| POSITION | VAS$_1$ | VAS$_2$ | VAS$_3$ | EFL | F/# |
|---|---|---|---|---|---|
| 1 | 3.278 | 13.017 | .600 | 38.004 | 4.4 |
| 2 | 1.885 | 11.380 | 9.010 | 49.998 | 5.6 |
| 3 | .817 | 10.002 | 22.032 | 66.284 | 7.2 |

The ratio of powers of the first optical unit A$_4$ to the third optical unit C$_4$ is 1.2. The ratio of extreme focal length in the fourth embodiment is 66.38 or about 1.7:1

FIG. 5 illustrates the fifth embodiment of the present invention corresponding to the fourth species of the invention. As in the case of the first embodiment, in this fifth embodiment, the front optical unit A$_5$ has a single negative element E502, and the third optical unit C$_5$ consists of a single negative meniscus lens element E532. However, the second optical unit B$_5$ is different from the construction of the optical unit B$_1$ in the first embodiment. While the second optical unit B$_1$ of the first embodiment was not color corrected, the second optical unit B$_5$ of the fifth embodiment is color corrected. The second optical unit B$_5$ comprises a doublet component and consists of a biconvex lens element E522 and a negative meniscus lens element E524. Again, as in first embodiment, all of the lens elements are made of plastic.

The zooming motion of the front optical unit compared to the second optical unit B5 is quite small, therefore it may be possible to combine the two units for focusing. This would leave only two groups for the zooming system.

Tables 5A through 5C give the important parameters of the fifth embodiment.

TABLE 5-A

| SURFACE | RADIUS | THICK-NESS | GLASS | CLEAR APERTURE |
|---|---|---|---|---|
| S1 | −33.479 | 1.300 | ACRYLIC | 18.4 |
| S2 | 70.626 | VAS$_1$ | | 17.2 |
| S3 | 14.339 | 4.300 | ACRYLIC | 11.7 |
| S4 | −12.411 | .037 | | 10.9 |
| S5 | −12.102 | 2.315 | 591307 | 10.9 |
| S6 | −27.966 | 4.810 | | 10.4 |
| | ∞ | 2.614 | | 8.8 |
| | ∞ | VAS$_2$ | | 9.5 |
| S7 | −9.498 | 3.159 | ACRYLIC | 16.7 |
| S8 | −17.758 | 31.850 | | 21.9 |

TABLE 5-B

POLYNOMIAL ASPHERS
(COEFFICIENTS OF THE EVEN POWERED TERMS)

| SURFACE | AD (4TH) | AE (6TH) | AF (8TH) |
|---|---|---|---|
| S2 | −1.200E-05 | 3.248E-08 | 9.423E-11 |
| S3 | 2.159E-05 | 2.531E-07 | −3.548E-10 |
| S6 | 2.702E-05 | −7.391E-07 | 4.572E-08 |
| S8 | −8.310E-06 | −2.038E-07 | 2.104E-09 |

| SURFACE | AG (10TH) | AH (12TH) | AF (14TH) |
|---|---|---|---|
| S2 | −3.066E-11 | 6.035E-13 | −3.432E-15 |
| S3 | 1.236E-10 | 1.171E-12 | 5.420E-14 |
| S6 | −1.343E-09 | 3.069E-11 | −2.479E-13 |
| S8 | −1.512E-11 | 4.339E-15 | 3.746E-17 |

TABLE 5-C

ZOOM SPACING DATA

| POSITION | VAS$_1$ | VAS$_2$ | BFL | EFL | F/# |
|---|---|---|---|---|---|
| 1 | 10.896 | 16.600 | 10.55 | 37.84 | 4.5 |
| 2 | 5.982 | 14.341 | 19.62 | 50.00 | 5.5 |
| 3 | 2.004 | 12.736 | 30.28 | 65.55 | 6.9 |

The ratio of the extreme focal length in the sixth embodiment is 1.7:1 which qualifies the magnification range as 2:1. The F1 number changes from f/6.9 to f/4.55.

FIG. 6 further illustrates the fourth species of the present invention. It corresponds to the sixth illustrative embodiment. The lens system of the sixth embodiment shown in FIG. 6 is similar to the lens system of the fifth embodiment shown in FIG. 5. The second, positive unit B$_6$ of sixth embodiment, is also in the form of a doublet. In the sixth illustrative embodiment, the doublet takes a form of a positive biconvex lens element E622 and a negative biconcave lens element E624. Due to the difference in refractive index of plastic materials used in the sixth, versus those used in the fifth embodiment, the relative size and form of corresponding elements in a second optical unit differ between the fifth and the sixth embodiments for example the lens embodiments comprising the second optical unit of the sixth embodiment are larger in diameter than those of the fifth embodiment. Tables 6A through 6C give the important parameters of the sixth illustrative embodiment.

TABLE 6-A

| SURFACE | RADIUS | THICK-NESS | OPTICAL MATERIAL | CLEAR APERTURE |
|---|---|---|---|---|
| S1 | −37.78 | 1.800 | 591307 | 23.0 |
| S2 | 147.99 | VAS$_1$ | | 21.9 |
| S3 | 10.72 | 6.198 | ACRYLIC | 16.2 |
| S4 | −45.24 | .232 | | 14.4 |
| S5 | −57.62 | 1.624 | 591307 | 13.4 |
| S6 | 191.77 | .000 | | 11.3 |
| | ∞ | 6.067 | | 11.6 |
| | ∞ | VAS$_2$ | | 7.4 |

TABLE 6-A-continued

| SURFACE | RADIUS | THICKNESS | OPTICAL MATERIAL | CLEAR APERTURE |
|---|---|---|---|---|
| S7 | −10.89 | 1.673 | ACRYLIC | 16.3 |
| S8 | −27.01 | 27.992 | | 20.3 |

TABLE 6-B

POLYNOMIAL ASPHERS
(COEFFICIENTS OF THE EVEN POWERED TERMS)

| SURFACE | AD (4TH) | AE (6TH) | AF (8TH) |
|---|---|---|---|
| S3 | 1.156E-04 | 5.922E-07 | 2.566E-09 |
| S6 | 1.510E-04 | 1.162E-06 | 3.713E-08 |
| S8 | −5.978E-07 | −1.705E-07 | 2.776E-09 |

| SURFACE | AG (10TH) | AH (12TH) | AF (14TH) |
|---|---|---|---|
| S3 | 2.012E-10 | −2.724E-12 | 2.023E-14 |
| S6 | −2.024E-09 | 7.949E-11 | −1.025E-12 |
| S8 | −1.766E-11 | −2.943E-14 | 4.735E-16 |

TABLE 6-C

ZOOM SPACING DATA

| POSITION | VAS$_1$ | VAS$_2$ | BFL | EFL | F/# |
|---|---|---|---|---|---|
| 1 | 11.553 | 14.658 | 10.55 | 37.70 | 4.6 |
| 2 | 5.898 | 13.171 | 17.69 | 50.00 | 5.5 |
| 3 | 1.812 | 11.844 | 26.43 | 65.14 | 6.9 |

Figure 7:
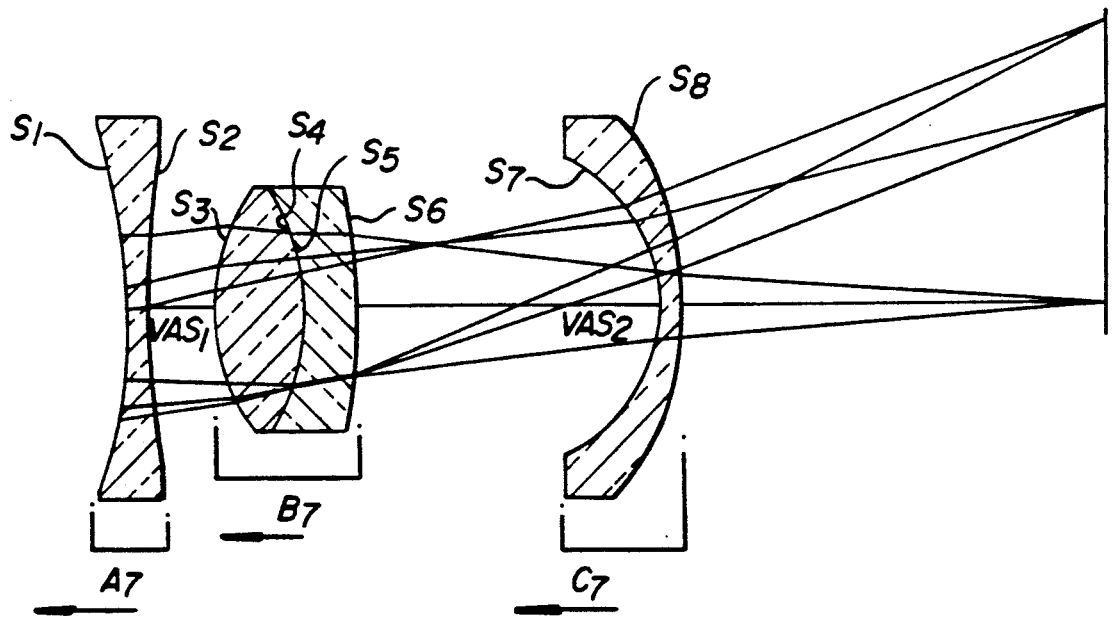
FIG. 7 shows the outline of a zoom lens corresponding to a seventh illustrative embodiment of the present invention.
Figure 9:
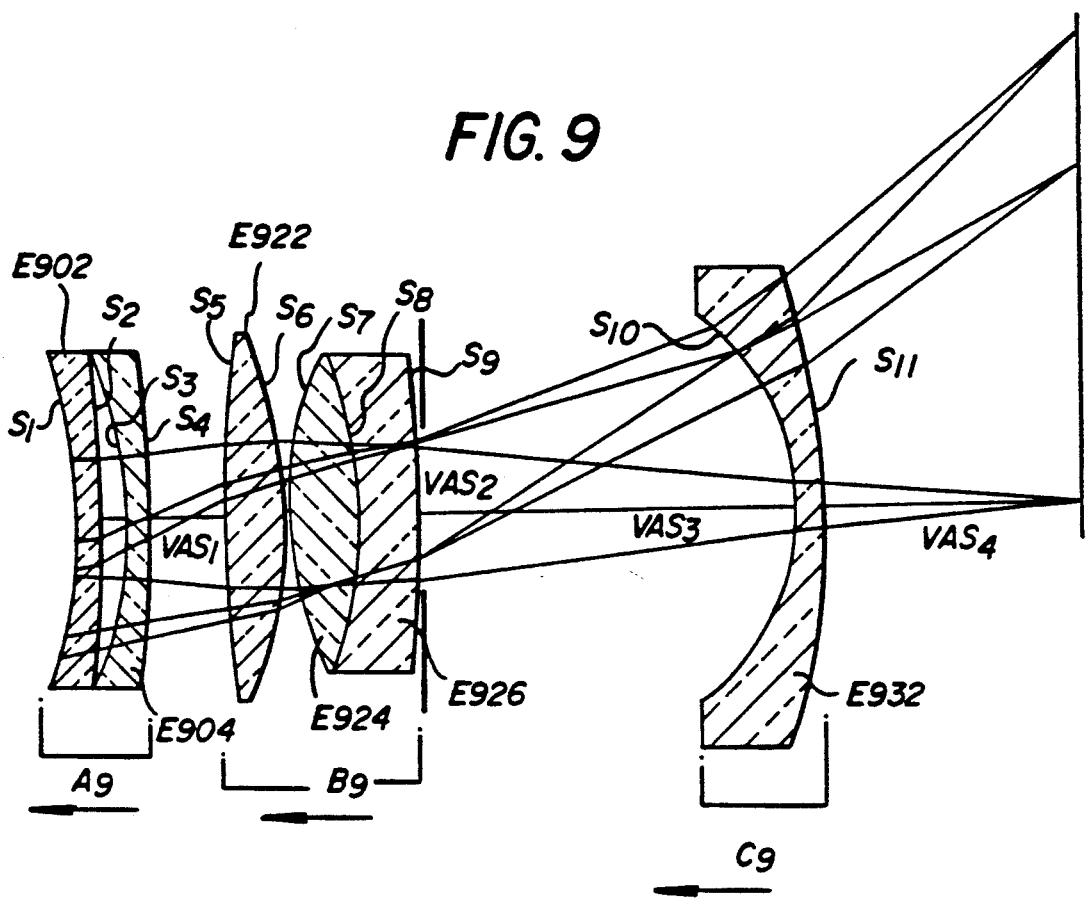
FIG. 9 shows the outline of a zoom lens corresponding to a ninth illustrative embodiment of the present invention.

FIG. 7 corresponds to the seventh illustrative embodiment. This embodiment is very similar to the fifth and sixth illustrative embodiments illustrated in FIGS. 5 and 6. Because these embodiments are very similar, further description will not be given, and for understanding of the seventh embodiment, reference is directed to the description of the fifth embodiment herein. Tables 7A through 7C give important parameters of the seventh embodiment.

TABLE 7-A

| SURFACE | RADIUS | THICKNESS | GLASS | CLEAR APERTURE |
|---|---|---|---|---|
| S1 | −39.892 | 1.800 | ACRYLIC | 23.9 |
| S2 | 92.587 | VAS$_1$ | | 22.3 |
| S3 | 14.158 | 6.200 | ACRYLIC | 15.5 |
| S4 | −15.103 | .036 | | 15.5 |
| S5 | −14.886 | 3.590 | 591307 | 15.5 |
| S6 | −48.353 | .000 | | 15.5 |
| | ∞ | 4.856 | | 10.0 |
| | ∞ | VAS$_2$ | | 8.5 |
| S7 | −10.923 | 1.670 | ACRYLIC | 19.2 |
| S8 | −21.623 | 29.607 | | 23.8 |

TABLE 7-B

POLYNOMIAL ASPHERS
(COEFFICIENTS OF THE EVEN POWERED TERMS)

| SURFACE | AD (4TH) | AE (6TH) | AF (8TH) |
|---|---|---|---|
| S2 | −5.142E-06 | −8.010E-08 | 2.796E-09 |
| S3 | 4.428E-05 | −5.124E-08 | 5.275E-09 |
| S6 | 4.575E-05 | −6.689E-07 | 5.842E-08 |
| S8 | −1.209E-06 | −4.207E-07 | 4.878E-09 |

| SURFACE | AG (10TH) | AH (12TH) | AF (14TH) |
|---|---|---|---|
| S2 | −4.484E-11 | 3.262E-13 | −8.798E-16 |
| S3 | 1.542E-10 | −5.361E-12 | 5.166E-14 |
| S6 | −2.502E-09 | 6.113E-11 | −6.073E-13 |
| S8 | −1.566E-11 | −1.087E-13 | 5.703E-16 |

TABLE 7-C

ZOOM SPACING DATA

| POSITION | VAS$_1$ | VAS$_2$ | BFL | EFL | F/# |
|---|---|---|---|---|---|
| 1 | 15.938 | 20.160 | 11.003 | 38.799 | 4.55 |
| 2 | 10.030 | 17.851 | 19.013 | 49.989 | 5.50 |
| 3 | 3.290 | 16.499 | 29.607 | 68.613 | 6.90 |

Figure 8:
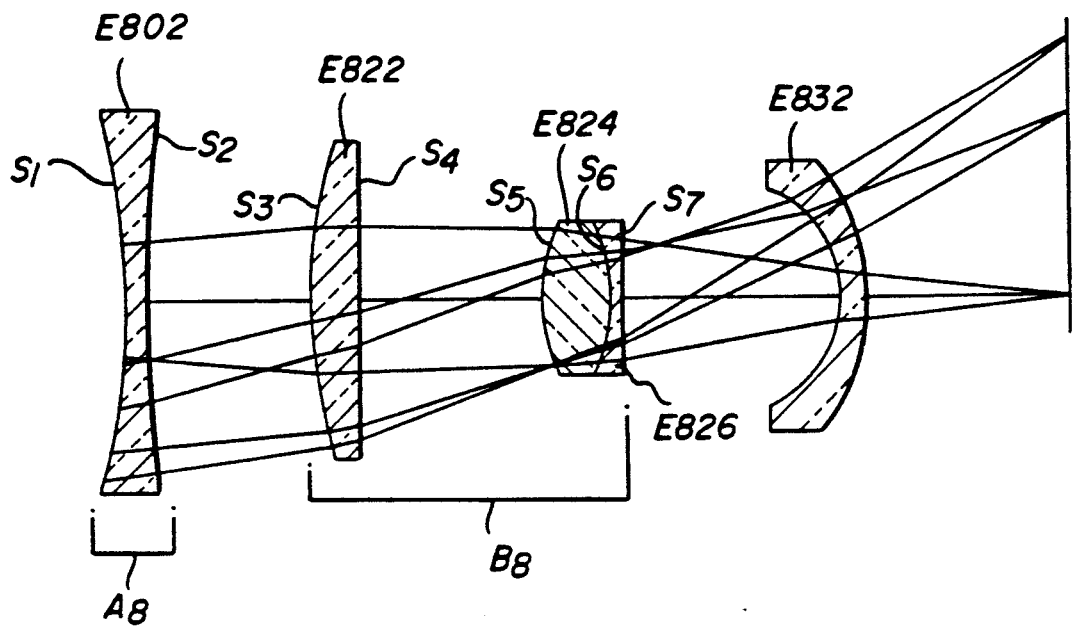
FIG. 8 shows the outline of a zoom lens corresponding to an eighth illustrative embodiment of the present invention.

FIG. 8 illustrates the eighth embodiment of the present invention and corresponds to the fifth species of the invention. Table 8 gives values for various parameters describing the eighth embodiment. The first optical unit A$_8$ and the last optical unit C$_8$ of the eighth embodiment are similar to those of the first embodiment, A$_1$ and C$_1$. The second optical unit B$_8$ of the eighth embodiment is different from the second optical unit B$_1$ of the first embodiment. The second optical unit B$_1$ of the first embodiment was not color corrected. The second optical unit of the fifth embodiment is color corrected. The second optical unit B$_1$ of the first embodiment consists of a single positive lens element. The second optical unit B$_8$ consists of two positive lens components-a single positive lens element E822 and a cemented doublet. The cemented doublet consists of a biconcave lens element E824 and a negative biconcave lens element E826 cemented to it. Tables 8A-8C give values for various parameters describing the eighth embodiment.

TABLE 8-A

| SURFACE | RADIUS | THICKNESS | GLASS | CLEAR APERTURE |
|---|---|---|---|---|
| S1 | −51.163 | 1.700 | NBFD11 | 26.3 |
| S2 | 146.318 | VAS$_1$ | | 25.4 |
| S3 | −34.987 | 3.769 | LAC12 | 21.4 |
| S4 | −17115.910 | 13.982 | | 20.5 |
| S5 | 14.296 | 4.939 | BSC7 | 10.3 |
| S6 | −14.296 | 1.000 | FL7 | 9.3 |
| S7 | 92.255 | 1.876 | | 8.9 |
| | ∞ | 1.614 | | 8.3 |
| | ∞ | VAS$_2$ | | 7.9 |
| S8 | −8.671 | 1.900 | FC5 | 15.0 |
| S9 | −15.783 | 35.010 | | 19.0 |

TABLE 8-B

ZOOM SPACING DATA

| POSITION | VAS$_1$ | VAS$_2$ | BFL | EFL | F/# |
|---|---|---|---|---|---|
| 1 | 12.341 | 12.939 | 15.403 | 38.804 | 4.60 |
| 2 | 6.662 | 11.611 | 23.357 | 50.006 | 5.60 |
| 3 | .590 | 10.869 | 35.010 | 68.638 | 7.20 |

Illustrative embodiments numbers nine through sixteen are very similar to the eighth illustrative embodiment and are shown in FIGS. 9-13. Tables 9 through 16 provide the important parameters for the above-mentioned embodiments.

TABLE 9-A

| SURFACE | RADIUS | THICKNESS | GLASS | CLEAR APERTURE |
|---|---|---|---|---|
| S1 | −19.489 | 1.000 | NBFD10 | 15.8 |
| S2 | −57.315 | 1.100 | | 15.7 |
| S3 | −16.491 | 1.000 | FC5 | 15.8 |
| S4 | −54.054 | VAS$_1$ | | 16.1 |
| S5 | 46.985 | 2.700 | F8 | 16.4 |
| S6 | −19.197 | .200 | | 16.4 |
| S7 | 15.360 | 3.000 | BSC7 | 13.4 |
| S8 | −16.215 | 2.500 | FD6 | 13.4 |
| S9 | −53.873 | VAS$_2$ | | 11.6 |
| | ∞ | VAS$_3$ | | 6.1 |
| S10 | −10.944 | 1.200 | ACRYLIC | 14.8 |
| S11 | −30.947 | VAS$_4$ | | 18.8 |

TABLE 9-A-continued

| SURFACE | RADIUS | THICK-NESS | GLASS | CLEAR APERTURE |
|---|---|---|---|---|
| | ∞ | 5.001 | | 33.1 |

TABLE 9-B

POLYNOMIAL ASPHERS
(COEFFICIENTS OF THE EVEN POWERED TERMS)

| SURFACE | AD (4TH) | AE (6TH) | AF (8TH) | AG (10TH) |
|---|---|---|---|---|
| 10 | −8.197E-05 | −1.149E-06 | 6.871E-09 | 2.958E-10 |

TABLE 9-C

ZOOM SPACING DATA

| POSITION | $VAS_1$ | $VAS_2$ | $VAS_3$ | $VAS_4$ | EFL | F/# |
|---|---|---|---|---|---|---|
| 1 | 3.063 | .276 | 15.800 | 6.000 | 29.000 | 6.2 |
| 2 | 2.039 | 7.690 | 4.854 | 16.946 | 38.606 | 5.8 |
| 3 | 2.541 | 3.119 | 11.377 | 10.423 | 33.002 | 6.3 |

The lens system design represented by Tables 9A and 9B is a 1.4× zoom lens. This lens system, corresponding to the ninth embodiment has six lens elements arranged into three optical units. The first optical unit $A_9$ contains two negative meniscus lens elements E902 and E904. The concave surface of the lens elements E902 and E904 are oriented towards the object side. The first optical unit $A_9$ is followed by a second optical unit $B_9$. The optical unit $B_9$ is color corrected and contains two lens components. The first lens component of the second optical unit $B_9$ is a biconvex lens element E922, the second optical component is a cemented doublet. It consists of a biconvex lens element E924 cemented to a meniscus lens element E926. The second optical unit $B_9$ is followed by a third optical unit $C_9$. The third optical unit $C_9$ contains a single negative meniscus lens element E932, oriented with its concave surface towards the object side. This design is of the type where the aperture stop is positioned stationary relative to the image plane between the second zooming optical unit $B_9$ and the third zooming optical unit $C_9$. As a result the F-number varies from F/6.2 at the wide angle to F/5.8 at the longest focal length. Since the variation of the lens speed with zooming is so small, it can probably be assumed that for all the practical purposes the maximum F-number of the lens is constant. Consequently, one of the advantages of a camera utilizing this design is that the exposure determination can be done in a very simple fashion. Since the maximum speed of the lens at the wide angle is only F/6, the correction of the spherical aberation is easily achieved. The astigmatism and the tangential field are corrected by using an asphere on the rear element of the lens system.

TABLE 10-A

| SURFACE | RADIUS | THICK-NESS | GLASS | CLEAR APERTURE |
|---|---|---|---|---|
| S1 | −18.012 | 1.000 | TAF3 | 15.5 |
| S2 | 474.104 | $VAS_1$ | | 15.4 |
| S3 | 58.005 | 2.700 | FL7 | 15.3 |
| S4 | −19.016 | .200 | | 15.3 |
| S5 | 13.636 | 3.000 | FC5 | 12.6 |
| S6 | −20.931 | 2.500 | FD6 | 12.1 |
| S7 | −104.385 | $VAS_2$ | | 10.3 |
| | ∞ | $VAS_3$ | | 6.4 |
| S8 | −10.036 | 1.200 | ACRYLIC | 14.8 |
| S9 | −23.395 | $VAS_4$ | | 18.9 |
| | ∞ | 4.999 | | 33.7 |

TABLE 10-B

POLYNOMIAL ASPHERS
(COEFFICIENTS OF THE EVEN POWERED TERMS)

| SURFACE | AD (4TH) | AE (6TH) | AF (8TH) |
|---|---|---|---|
| S8 | −9.612E-05 | −1.974E-06 | 3.889E-08 |

| SURFACE NO. | AG (10TH) | AH (12TH) | AI (14TH) |
|---|---|---|---|
| S8 | −7.506E-10 | 0.000E+00 | 0.000E+00 |

TABLE 10-C

ZOOM SPACING DATA

| POSITION | $VAS_1$ | $VAS_2$ | $VAS_3$ | $VAS_4$ | EFL | F/# |
|---|---|---|---|---|---|---|
| 1 | 5.906 | .137 | 16.800 | 6.000 | 28.100 | 6.20 |
| 2 | 4.562 | 7.453 | 6.262 | 16.538 | 38.598 | 5.79 |
| 3 | 5.267 | 2.985 | 12.412 | 10.389 | 32.999 | 6.30 |

Figure 10:
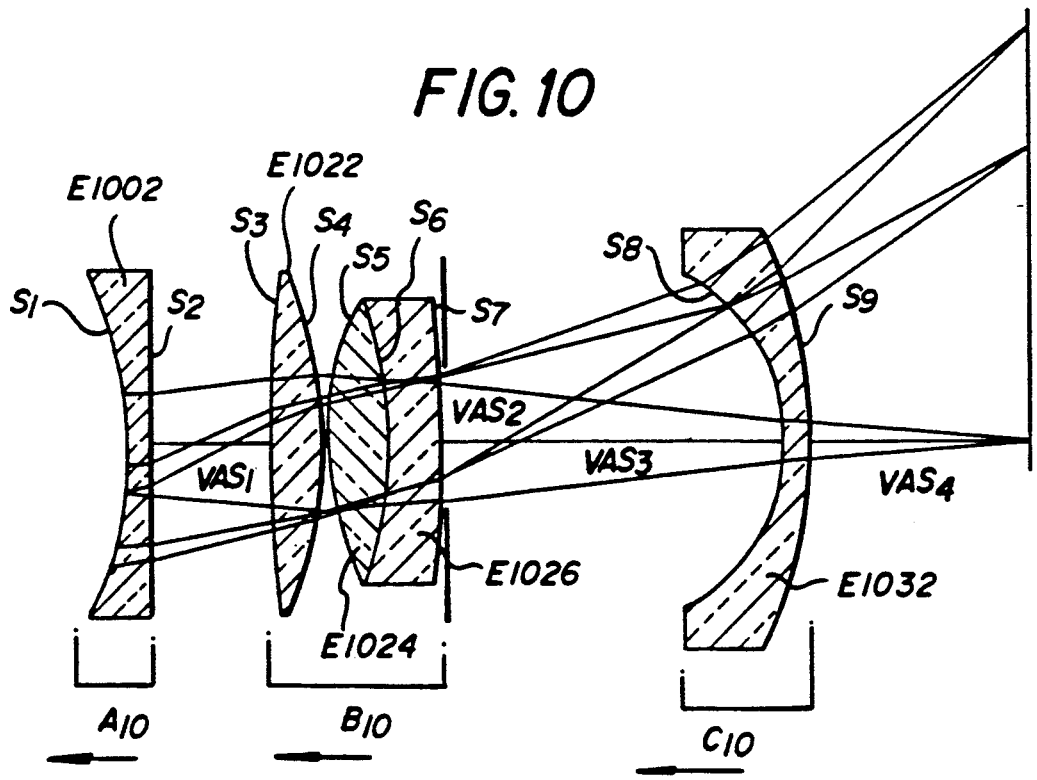
FIG. 10 shows the outline of a zoom lens corresponding to a tenth illustrative embodiment of the present invention.

FIG. 10 illustrates the tenth embodiment. This embodiment is similar to the ninth embodiment described above with one exception, it has only five lens elements instead of six. In addition the rearmost lens element has an aspheric surface to facilitate the correction of aberrations.

TABLE 11-A

| SURFACE | RADIUS | THICKNESS | GLASS | CLEAR APERTURE |
|---|---|---|---|---|
| S1 | −25.413 | 1.000 | LACL6 | 12.9 |
| S2 | 539.321 | 1.100 | | 12.0 |
| S3 | −18.363 | 1.000 | FC5 | 12.0 |
| S4 | 172.107 | $VAS_1$ | | 11.5 |
| S5 | 29.116 | 1.933 | BSC7 | 10.9 |
| S6 | −17.823 | .200 | | 10.8 |
| S7 | 12.308 | 2.600 | BACD5 | 9.2 |
| S8 | −14.030 | 5.440 | NBFD10 | 8.4 |
| S9 | −83.692 | .392 | | 6.8 |
| S10 | ∞ | $VAS_2$ | | 7.1 |
| S11 | −6.747 | 1.200 | FC5 | 12.7 |
| S12 | −12.213 | $VAS_3$ | | 16.6 |
| S13 | ∞ | 5.003 | | 34.2 |

TABLE 11-B

ZOOM SPACING DATA

| POSITION | $VAS_1$ | $VAS_2$ | $VAS_3$ | EFL | F/# |
|---|---|---|---|---|---|
| 1 | 1.785 | 11.865 | 6.572 | 29.003 | 4.60 |
| 2 | .587 | 10.283 | 14.819 | 38.607 | 5.79 |
| 3 | 1.209 | 11.114 | 10.049 | 33.004 | 5.11 |

Tables 11A through 11B provide the numerical data for the lens system corresponding to the eleventh illustrative embodiment. The lens system has six glass elements and its focal length ranges between 29 and 39 mm. The configuration is very similar to the lens system configuration of the ninth embodiment in terms of number of lens elements, their shapes and their arrangement into the optical units. However, in this configuration the aperture stop moves with the second zoom group and the diameter of the aperture stop is maintained at constant value. The maximum f-number of this lens system varies from F/4.5 at the wide angle to f/5.6 at the longest focal length. This lens system contains no aspherical surfaces.

TABLE 12-A

| SURFACE | RADIUS | THICK-NESS | GLASS | CLEAR APERTURE |
|---|---|---|---|---|
| S1 | −23.281 | 1.000 | LAC8 | 12.0 |

TABLE 12-A-continued

| SURFACE | RADIUS | THICK-NESS | GLASS | CLEAR APERTURE |
|---|---|---|---|---|
| S2 | −77.986 | 1.100 | | 11.4 |
| S3 | −18.509 | 1.000 | FC5 | 11.0 |
| S4 | 125.143 | $VAS_1$ | | 10.4 |
| S5 | 66.113 | 1.933 | BAF3 | 9.4 |
| S6 | −19.864 | .200 | | 9.0 |
| S7 | 13.664 | 3.000 | BSC7 | 8.2 |
| S8 | −13.716 | 2.500 | FD6 | 7.6 |
| S9 | −32.071 | .500 | | 7.5 |
| | ∞ | $VAS_2$ | | 7.8 |
| S10 | −7.949 | 1.200 | ACRYLIC | 14.6 |
| S11 | −13.964 | $VAS_3$ | | 18.5 |
| | ∞ | 4.100 | | 34.3 |

TABLE 12-B

POLYNOMIAL ASPHERS
(COEFFICIENTS OF THE EVEN POWERED TERMS)

| SURFACE NO. | AD (4TH) | AE (6TH) | AF (8TH) |
|---|---|---|---|
| 11 | −1.575E-05 | −3.731E-07 | 0.000E+00 |

| SURFACE NO. | AG (10TH) | AH (12TH) | AF (14TH) |
|---|---|---|---|
| 11 | 0.000E+00 | 0.000E+00 | 0.000E+00 |

TABLE 12-C

| | ZOOM SPACING DATA | | |
|---|---|---|---|
| POSITION | $VAS_1$ | $VAS_2$ | $VAS_3$ |
| 1 | 2.351 | 15.657 | 6.000 |
| 2 | .963 | 13.467 | 15.066 |
| 3 | 1.689 | 14.601 | 9.843 |

Figure 12:
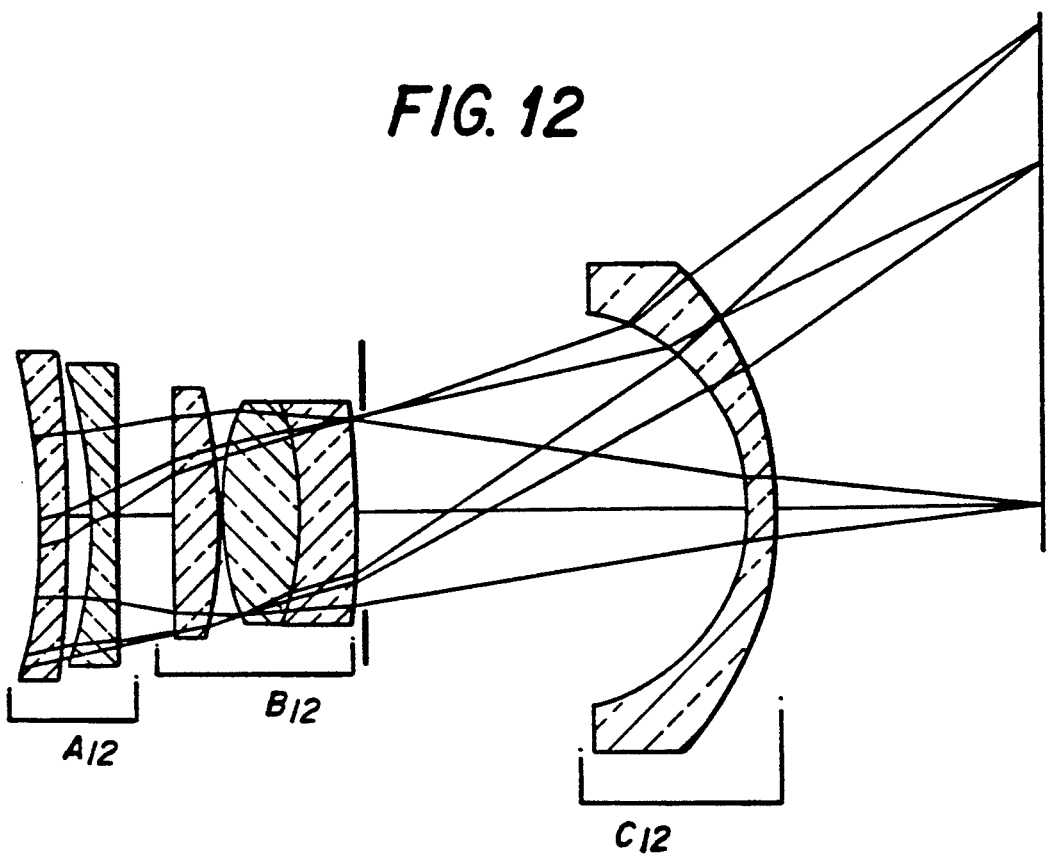
FIG. 12 shows the outline of a zoom lens corresponding to a twelfth illustrative embodiment of the present invention.
Figure 11:
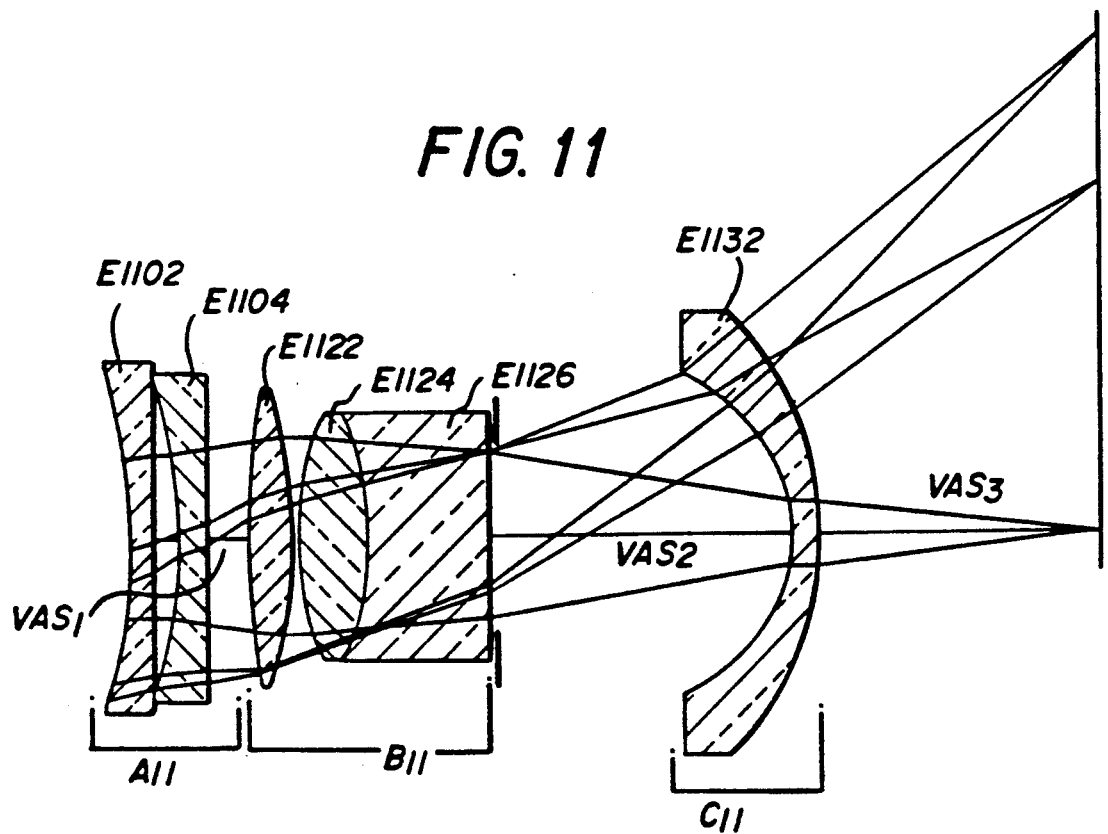
FIG. 11 shows the outline of a zoom lens corresponding to an eleventh illustrative embodiment of the present invention.

The twelfth illustrative embodiment illustrated on FIG. 12 and represented by Tables 12A through 12C is very similar to the eleventh illustrative embodiment. It has the same number of lens elements, the lens elements are shaped similarly and their arrangements into optical units are similar to that of the eleventh embodiment. As in the tenth embodiment, the aperture stop moves with the second optical unit and its diameter is maintained constant. The only significant difference between the eleventh and twelfth illustrative embodiment is that the twelfth embodiment has five glass and one plastic lens element. The plastic lens element is a rear lens element. One of the surfaces of the rear lens element is aspherical to fascilitate the correction of aberations.

TABLE 13-A

| SURFACE | RADIUS | THICK-NESS | GLASS | CLEAR APERTURE |
|---|---|---|---|---|
| S1 | −25.300 | 1.300 | LAC8 | 16.0 |
| S2 | ∞ | $VAS_1$ | | 15.5 |
| S3 | −174.280 | 2.600 | FC5 | 13.2 |
| S4 | −21.220 | $VAS_2$ | | 12.8 |
| S5 | 14.620 | 3.500 | LACL6 | 10.7 |
| S6 | −23.770 | 1.000 | NBFD10 | 10.1 |
| S7 | 137.500 | 3.060 | | 9.8 |
| | ∞ | $VAS_3$ | | 8.8 |
| S8 | −8.285 | 1.600 | FC5 | 14.6 |
| S9 | −13.377 | $VAS_4$ | | 17.8 |
| | ∞ | 6.900 | | 35.1 |

TABLE 13-B

| | ZOOM SPACING DATA | | | | | |
|---|---|---|---|---|---|---|
| POSITION | $VAS_1$ | $VAS_2$ | $VAS_3$ | $VAS_4$ | EFL | F/# |
| 1 | 6.318 | 1.539 | 15.357 | 10.333 | 39.000 | 4.60 |
| 2 | 2.203 | 1.539 | 14.165 | 20.033 | 53.000 | 5.79 |

TABLE 13-B-continued

| | ZOOM SPACING DATA | | | | | |
|---|---|---|---|---|---|---|
| POSITION | $VAS_1$ | $VAS_2$ | $VAS_3$ | $VAS_4$ | EFL | F/# |
| 3 | 4.608 | 1.539 | 14.759 | 14.022 | 44.000 | 5.03 |
| 4 | 7.539 | .311 | 15.357 | 10.333 | 36.512 | 4.43 |
| 5 | 3.510 | .232 | 14.165 | 20.033 | 48.507 | 5.50 |

Figure 13:
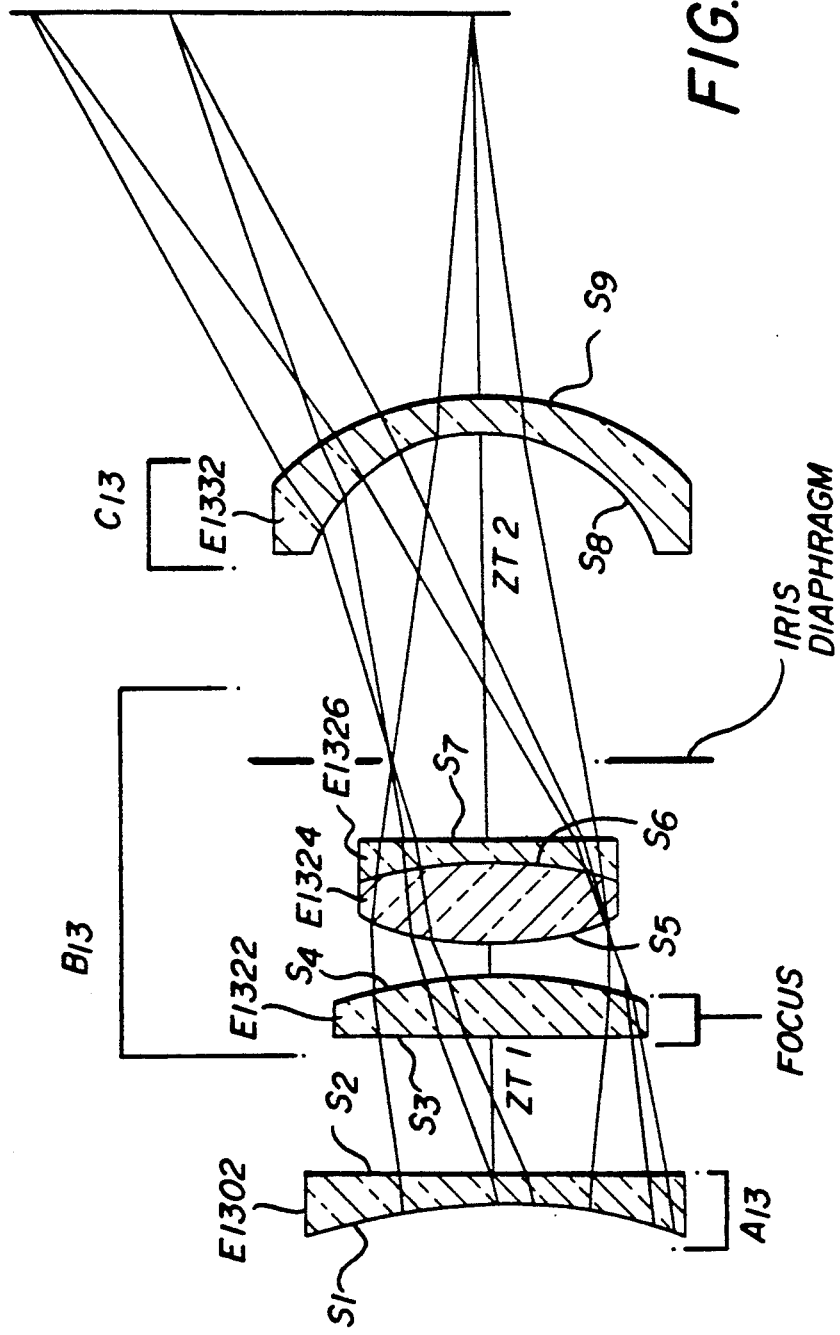
FIG. 13 shows the outline of a zoom lens corresponding to a thirteenth illustrative embodiment of the present invention.

FIG. 13 illustrates the thirteenth embodiment of the present invention. Tables 13-A and 13-B provide important parameters of the lens system of this embodiment. The thirteenth embodiment is a five lens element, 1.4 zoom lens system. The F-number of the lens system varies from F/4.5 to F/5.6, and the focal length varies between 38 to 55 mm. This lens system has an internal focusing, i.e., focusing is accomplished by moving the first element of the second optical unit towards the film plane.

TABLE 14-A

| SURFACE | RADIUS | THICKNESS | GLASS | CLEAR APERTURE |
|---|---|---|---|---|
| S1 | −32.554 | 1.300 | BAC05 | 19.6 |
| S2 | 55.013 | $VAS_1$ | | 18.4 |
| S3 | 113.511 | 2.700 | TAF1 | 16.1 |
| S4 | −31.761 | $VAS_2$ | | 15.7 |
| S5 | 12.136 | 3.700 | FC5 | 11.7 |
| S6 | −29.225 | 1.000 | FD2 | 10.3 |
| S7 | 38.755 | 3.348 | | 9.5 |
| | ∞ | $VAS_3$ | | 8.2 |
| S8 | −8.541 | 1.200 | LAC8 | 15.4 |
| S9 | −14.147 | .200 | | 19.3 |
| S10 | 310.334 | 4.400 | FL7 | 26.5 |
| S11 | −48.348 | $VAS_4$ | | 28.2 |
| | ∞ | 6.909 | | 35.3 |

TABLE 14-B

| POSI-TION | $VAS_1$ | $VAS_2$ | $VAS_3$ | $VAS_4$ | EFL | F/# |
|---|---|---|---|---|---|---|
| 1 | 7.228 | 1.558 | 15.366 | 4.100 | 36.201 | 4.5 |
| 2 | 1.913 | 1.558 | 13.534 | 16.614 | 53.005 | 5.8 |
| 3 | 8.559 | .227 | 15.366 | 4.100 | 33.534 | 4.3 |
| 4 | 3.252 | .227 | 13.534 | 16.614 | 47.794 | 5.5 |
| 5 | 4.362 | 1.558 | 14.109 | 10.378 | 44.010 | 5.1 |

Figure 14:
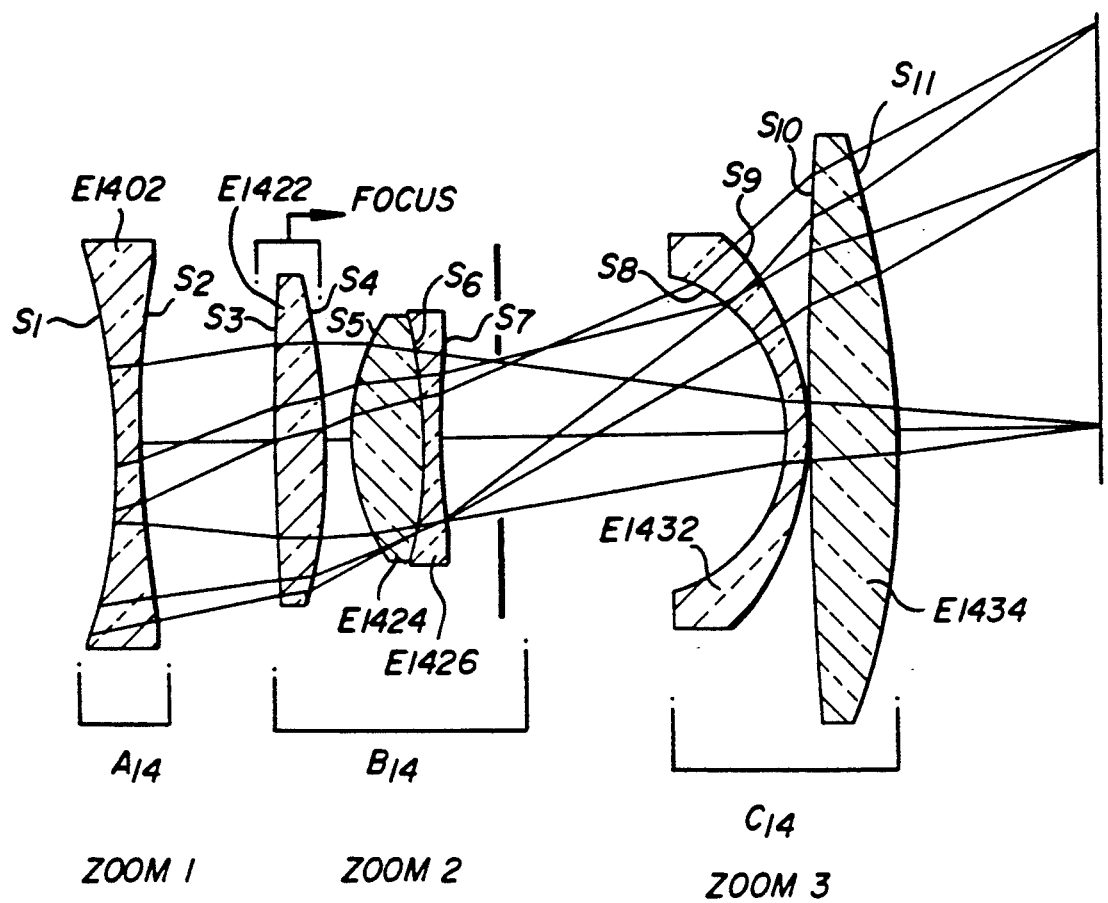
FIG. 14 shows the outline of a zoom lens corresponding to a fourteenth illustrative embodiment of the present invention.

The fourteenth illustrative embodiment, shown in FIG. 14 is similar to the thirteenth embodiment. Tables 14a and 14b provide the important data.

The lens system of the fourteenth embodiment includes a front, negative power optical unit A14 movable for zooming, a second optical unit B14 of positive power movable for zooming and a third optical unit C14 of negative power also movable for zooming. The front optical unit A14 consists of a single biconcave lens element E1402. The second optical unit consists of two subunits, front and rear respectively. The front subunit is a single positive biconvex lens element E1422. The front subunit, moves towards the film plane for focusing. The rear subunit is a cemented doublet component. It consists of a biconvex positive lens element E1424 cemented to a biconcave lens element E1426. Both subunits move forward for zooming. The third optical unit has two lens components—a front component is a negative meniscus lens element E1432 and the rear component is a positive biconvex lens element E1434.

TABLE 15-A

| SURFACE | RADIUS | THICKNESS | GLASS | CLEAR APERTURE |
|---|---|---|---|---|
| S1 | −21.860 | 1.300 | TAF1 | 15.4 |

TABLE 15-A-continued

| SURFACE | RADIUS | THICKNESS | GLASS | CLEAR APERTURE |
|---|---|---|---|---|
| S2 | −231.770 | VAS$_1$ | | 14.9 |
| S3 | −4330.810 | 2.700 | CF6 | 12.3 |
| S4 | −21.296 | .200 | | 11.8 |
| S5 | 18.105 | 3.400 | BAC4 | 10.5 |
| S6 | −20.362 | 1.000 | FD1 | 10.1 |
| S7 | −259.226 | 1.000 | | 9.8 |
|  | ∞ | VAS$_2$ | | 9.5 |
| S8 | −10.849 | 1.600 | ACRYLIC | 18.6 |
| S9 | −21.349 | VAS$_3$ | | 23.1 |
| S10 | ∞ | 6.898 | | 34.8 |

TABLE 15-B

POLYNOMIAL ASPHERS
(COEFFICIENTS OF THE EVEN POWERED TERMS)

| SURFACE NO. | AD (4TH) | AE (6TH) | AF (8TH) |
|---|---|---|---|
| S8 | −1.767E-05 | −8.812E-08 | −1.331E-09 |

| SURFACE NO. | AG (10TH) | AH (12TH) | AI (14TH) |
|---|---|---|---|
| S9 | 1.097E-11 | −1.726E-13 | 1.309E-15 |

TABLE 15-C

| | ZOOM SPACING DATA | | | | |
|---|---|---|---|---|---|
| POSITION | VAS$_1$ | VAS$_2$ | VAS$_3$ | EFL | F/# |
| 1 | 7.193 | 23.607 | 4.100 | 36.215 | 4.53 |
| 2 | 3.896 | 19.716 | 18.940 | 53.012 | 6.20 |
| 3 | 5.393 | 21.479 | 11.079 | 44.008 | 5.30 |

Figure 15:
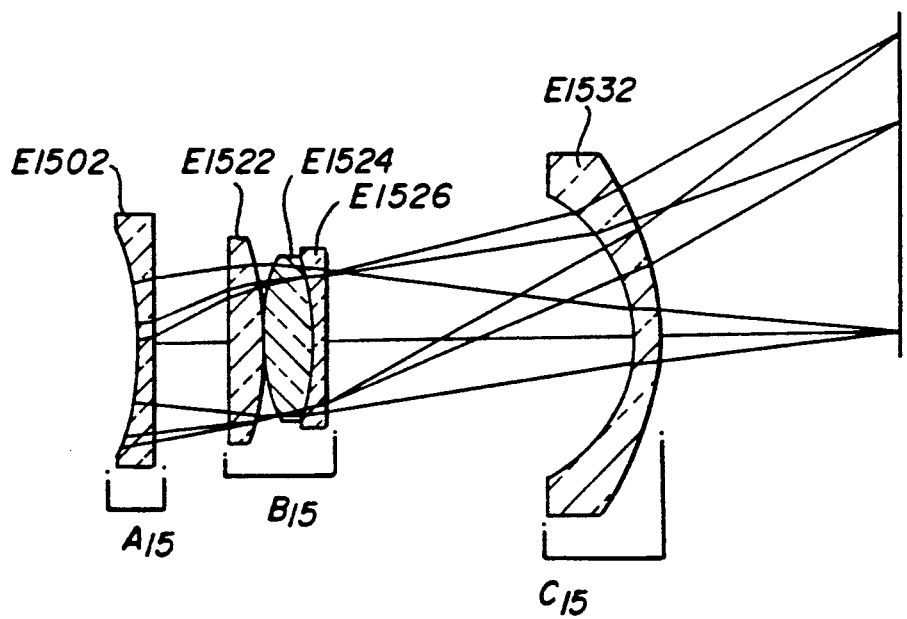
FIG. 15 shows the outline of a zoom lens corresponding to a fifteenth illustrative embodiment of the present invention.
Figure 16:
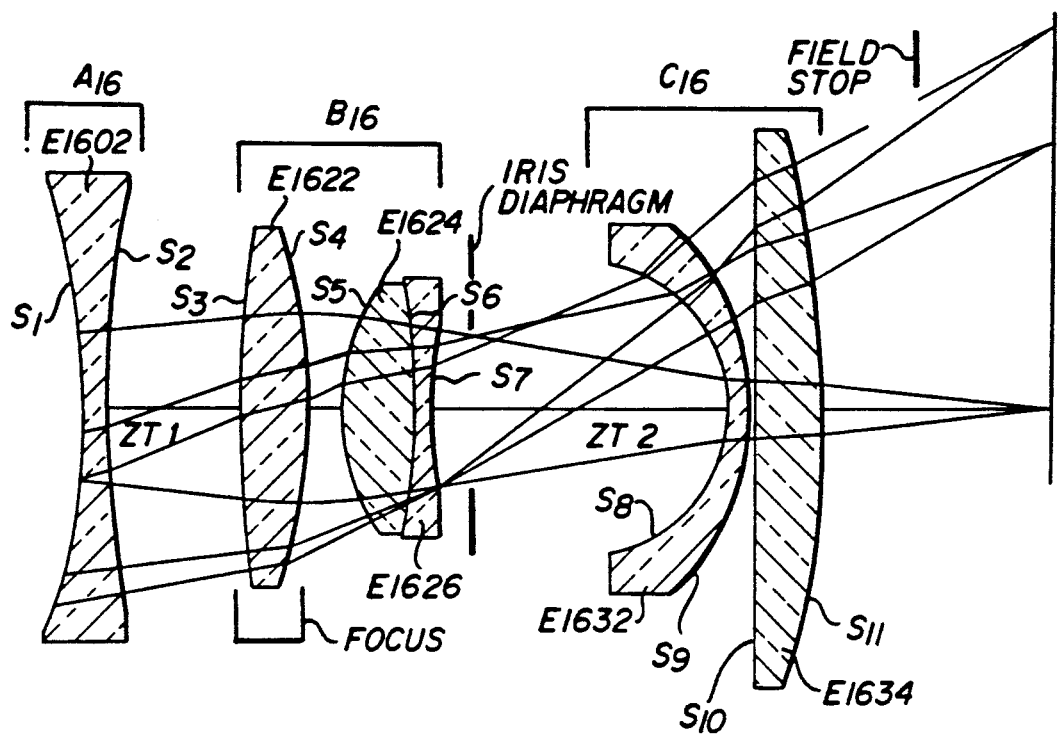
FIG. 16 shows the outline of a zoom lens corresponding to a sixteenth illustrative embodiment of the present invention.

Tables 15A through 15C provide yet another example of the fifth species with internal focusing. FIG. 15 illustrates that the lens system has five elements E1502 through E1532, arranged in three optical units A$_{15}$, B$_{15}$, and C$_{15}$. This lens system has four glass and one plastic lens elements. The plastic lens element has an aspheric surface. As in the previous embodiment, all three optical units move differentially during zooming, and one of the subunits of the second optical unit is moved for focusing.

TBALE 16-A

| SURFACE | RADIUS | THICKNESS | GLASS | CLEAR APERTURE |
|---|---|---|---|---|
| S1 | −35.148 | 1.300 | PCD2 | 22.3 |
| S2 | 61.193 | VAS$_1$ | | 20.8 |
| S3 | 75.049 | 3.600 | F5 | 18.2 |
| S4 | −31.097 | VAS$_2$ | | 17.6 |
| S5 | 11.907 | 4.000 | PCD2 | 12.4 |
| S6 | −32.563 | 1.000 | FD13 | 10.3 |
| S7 | 32.563 | 2.402 | | 8.8 |
|  | ∞ | VAS$_3$ | | 7.7 |
| S8 | −7.833 | 1.200 | LAC14 | 14.4 |
| S9 | −13.430 | .200 | | 18.6 |
| S10 | 1405.963 | 3.800 | FD1 | 26.1 |
| S11 | −52.074 | VAS$_4$ | | 27.7 |
|  | ∞ | 6.895 | | 34.8 |

TABLE 16-B

| | ZOOM SPACING DATA | | | |
|---|---|---|---|---|
| POSITION | VAS$_1$ | VAS$_2$ | VAS$_3$ | VAS$_4$ |
| 1 | 7.320 | 1.908 | 13.758 | 5.613 |
| 2 | .945 | 1.908 | 12.554 | 16.458 |
| 3 | 9.001 | .227 | 13.758 | 5.613 |
| 4 | 2.598 | .227 | 12.554 | 16.458 |

TABLE 16-B-continued

| | ZOOM SPACING DATA | | | |
|---|---|---|---|---|
| POSITION | VAS$_1$ | VAS$_2$ | VAS$_3$ | VAS$_4$ |
| 5 | 3.857 | 1.908 | 12.947 | 10.940 |

Because embodiment number 16 is very similar to the 14th embodiment, i.e., elements type, their form and their arrangement in optical units is the same as the elements to which they correspond in the fourteenth embodiment illustrated in FIG. 14, and since A is also similar to the fifteenth embodiment described herein, further description will not be given, an understanding of this embodiment, reference is directed to the description of the fourteenth and fifteenth embodiment herein.

TABLE 17-A

| SURFACE | RADIUS | THICKNESS | GLASS | CLEAR APERTURE |
|---|---|---|---|---|
| S1 | −66.552 | 2.000 | FC5 | 24.7 |
| S2 | 59.653 | VAS$_1$ | | 22.6 |
| S3 | 15.733 | 5.000 | CF6 | 8.9 |
| S4 | −12.148 | 1.000 | FD15 | 8.2 |
| S5 | −35.063 | 1.809 | | 8.2 |
|  | ∞ | 2.614 | | 7.7 |
| S6 | ∞ | VAS$_2$ | | 7.1 |
| S7 | −9.251 | 1.900 | FC5 | 15.5 |
| S8 | −16.393 | 32.448 | | 19.0 |

TABLE 17-B

| | ZOOM SPACING DATA | |
|---|---|---|
| POSITION | VAS$_1$ | VAS$_2$ |
| 1 | 26.462 | 17.149 |
| 2 | 16.958 | 16.107 |
| 3 | 10.480 | 15.429 |

Figure 17:
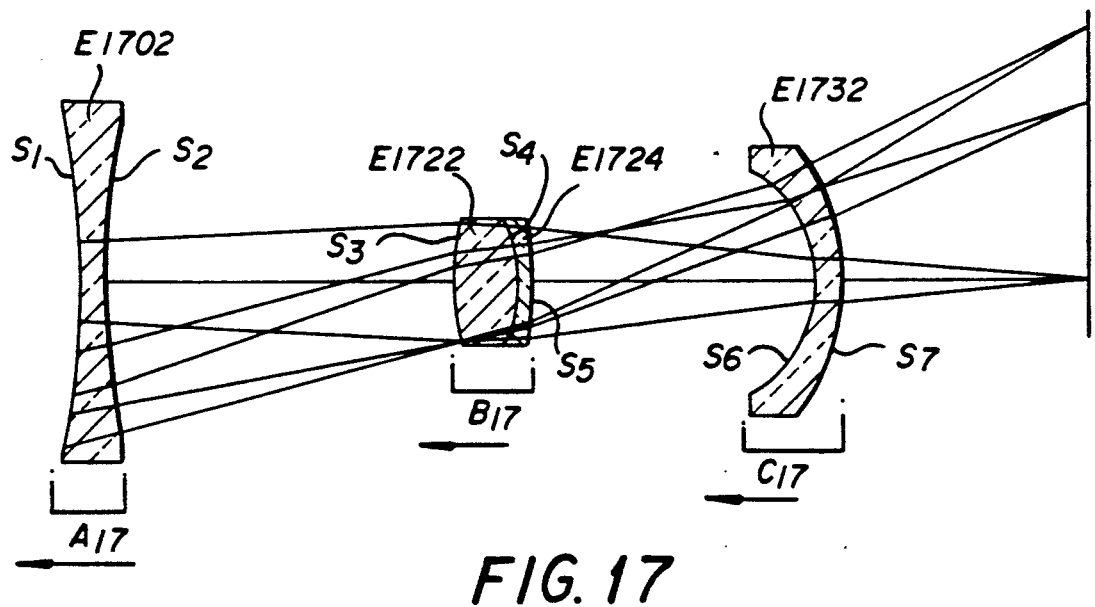
FIG. 17 shows the outline of a zoom lens corresponding to a seventeenth illustrative embodiment of the present invention.

FIG. 17 illustrates the sixth species of the invention and corresponds to the seventeenth embodiment of the present invention. The sixth species of the present invention are similar to the fourth species, the only difference, being that glass was used instead of plastic and fewer aspheres were utilized. The ratio of powers of the first optical and to the third optical unit is 0.74. Tables 17A-C provides important parameters of the embodiment illustrated in FIG. 17.

The invention has been described in detail with particular reference to a presently preferred embodiment, but it will be understood that variations and modifications can be effected within the spirit and scope of the invention.

What is claimed is:

1. A zoom lens comprising in order from an object side three optical units movable for zooming, a first optical unit that is negative, a second optical unit that is positive, and a third optical unit that is negative, in which said third optical unit provides a greater amount of the magnification change during zooming than provided by either of the first or the second optical unit and the third optical unit consists of a single negative lens element, and the ratio of powers of said first optical unit to said third optical unit of said zoom lens is between 0.7 and 1.6.

2. A zoom lens according to claim 1 in which the second optical unit is a single element.

3. A zoom lens according to claim 1 in which the second optical unit has no negative lens components.

4. A zoom lens according to claim 1 and further including a non-movable positive optical unit located nearest an image plane.

5. A zoom lens according to claim 1 in which the second optical unit consists of a singlet and a doublet.

6. A zoom lens according to claim 1, wherein the first, negative optical unit consists of a single negative lens element having a concave surface facing towards the object side of said zoom lens.

7. The zoom lens according to claim 1 and wherein the first optical unit consists of two negative lens components.

8. The zoom lens according to claim 7 and wherein a first lens component of said two negative lens components is a meniscus lens oriented with its concave surface towards a second lens component of said two negative lens components.

9. The zoom lens according to claim 7 and wherein the two negative lens components comprise two negative meniscus lens elements with the concave surfaces of said two meniscus lens elements oriented towards said object side.

10. The zoom lens according to claim 9 and wherein said second optical unit comprises a biconvex lens element and a doublet of positive power.

11. The zoom lens according to claim 7 and wherein a first of said two negative lens components consists of a single negative lens element with a concave surface of said single negative lens element facing said object side.

12. The zoom lens according to claim 11 and wherein the second optical unit comprises two positive optical components.

13. The zoom lens according to claim 12 and wherein a first component of said two positive optical components consists of a single positive lens element and a second component of said two positive optical components consists of a positive doublet.

14. The zoom lens according to claim 11 wherein said single negative lens element is a meniscus lens element.

15. A zoom lens comprising three optical units movable for zooming, a negative front optical unit, a positive middle optical unit, and a negative rear optical unit, in which said rear optical unit provides a greater amount of the magnification change during zooming than provided by either of the front or the middle optical unit and the front and rear optical units each consists of a single negative lens component, and the ratio of powers of said front optical unit to said rear optical unit is between 0.7 and 1.6 and in which said lens component of said rear optical unit consists entirely of a single negative element in which one surface of said element is aspherical.

16. A zoom lens comprising three optical units movable for zooming, a negative front optical unit, a positive middle optical unit and a negative rear optical unit, in which said rear optical unit provides a greater amount of the magnification change during zooming than provided by either of the front or the middle optical unit, the ratio of powers of said front optical unit to said rear optical unit is between 0.7 and 1.6 and in which said rear unit consists of a negative lens element and a biconvex positive lens element.

17. A zoom lens comprising:
a front lens optical unit of negative power movable along an optical axis for zooming;
a middle optical unit including two subunits each of positive power which move unitedly along the optical axis for zooming, one of the two subunits being movable along the optical axis for focusing;
a rear optical unit on the image side of the front and middle optical units, the rear optical unit including only one negative element, said negative element being convex to the rear, said rear unit being movable along the optical axis for maintaining a fixed focal plane during zooming.

18. A zoom lens system comprising three optical units movable for zooming, a negative first optical unit, a positive second optical unit and a negative third optical unit, in which said third optical unit provides a greater amount of the magnification change during zooming than provided by either of the first or the second optical unit and the third optical unit consists of a single negative lens element, and the ratio of powers of said first optical unit to said third optical unit is between 0.7 and 1.6 and wherein the power of the third optical unit relates to the power of the system at the short focal length zoom position, so that:

$$0.7 < \left|\frac{K_3}{K_w}\right| < 1.3,$$

wherein $K_3$ is the power of the 3rd optical unit and $K_w$ is the power of the lens system at the short focal length zoom position.

19. A zoom lens according to claim 18 in which the second optical unit consists of a single lens element.

20. A zoom lens according to claim 18 in which the second optical unit has no negative lens component.

21. A zoom lens according to claim 18 and further including a non-movable positive optical unit that is located nearest an image plane.

22. A zoom lens according to claim 18 in which the second optical unit is comprised of a singlet and a doublet.

23. A zoom lens according to claim 18, wherein the first optical unit consists of a single negative lens element having a concave surface facing towards the object side of said zoom lens system.

24. A zoom lens according to claim 18 in which said third optical unit consists of a negative lens element in which one surface of said element is aspherical.

25. A zoom lens comprising, in order from an object side, three optical units movable for zooming, a first optical unit that is negative, a second optical unit that is positive, and a third optical unit that is negative, in which said third optical unit provides a greater amount of magnification change during zooming than provided by either of the first or the second optical unit and the first optical unit consists of a single negative lens element, and the ratio of powers of said first optical unit to said third optical unit of said zoom lens is between 0.7 and 1.6.

26. The zoom lens according to claim 25 and wherein the second optical unit consists of a single lens element.

27. The zoom lens according to claim 25 and wherein the third optical unit consists of a single lens element.

28. The zoom lens according to claim 27 and wherein the second optical unit consists of a single lens element.

29. The zoom lens according to claim 28 and further including a fourth fixed optical unit located to the rear of the third optical unit, said fourth unit consisting of a single positive lens element.

30. The zoom lens according to claim 29 and wherein the lens element of the first optical unit is a biconcave lens element, the lens element of the second optical unit is a biconvex lens element and the lens element of the third optical unit is a meniscus lens element.

31. The zoom lens according to claim 28 and wherein the lens element of the first optical unit is a biconcave lens element, the lens element of the second optical unit is a biconvex lens element and the lens element of the third optical unit is a meniscus lens element.

32. The zoom lens according to claim 27 and wherein the single lens element of the third optical unit is a meniscus lens element.

33. The zoom lens according to claim 32 and wherein the single lens element of the third optical unit has an aspherical surface which faces away from said object side.

34. The zoom lens according to claim 32 and wherein the second optical unit is a doublet that consists of a biconvex lens element and a negative meniscus lens element.

35. The zoom lens according to claim 32 and wherein the second optical unit is a doublet that consists of a positive biconvex lens element and a negative biconcave lens element.

36. The zoom lens according to claim 32 and wherein the second optical unit consists of two positive lens components, wherein a first component of said lens components is a single positive lens element and a second component of said lens components is a doublet.

37. The zoom lens according to claim 36 and wherein the first of said lens components is movable relative to said second component for internal focusing.

38. The zoom lens according to claim 27 and wherein the second optical unit comprises two positive lens components.

39. The zoom lens according to claim 38 and wherein the single lens element of the third optical unit is a meniscus lens element.

40. The zoom lens according to claim 39 and wherein the single lens element of the third optical unit has an aspherical surface which faces away from said object side.

41. The zoom lens according to claim 25 and wherein the lens element of the first optical unit is a biconcave lens element, the second optical unit consists of two components, wherein a first of said two components is a biconvex lens element and a second of said two components in a doublet.

42. The zoom lens according to claim 41 and wherein both of said two components move for zooming and the first component moves relative to the second component for focusing.

43. The zoom lens according to claim 42 and wherein the third optical unit comprises two lens components, wherein a first component of said two lens components of said third optical unit comprises a negative meniscus lens element and a second component of said two lens components of said third optical unit comprises a positive biconvex lens element.

* * * * *